US012686809B2

(12) United States Patent
Piri et al.

(10) Patent No.: US 12,686,809 B2
(45) Date of Patent: Jul. 21, 2026

(54) METHODS AND FORMULATIONS FOR TREATING OIL-CONTAINING POROUS MEDIA FOR OIL RECOVERY

(71) Applicants: UNIVERSITY OF WYOMING, Laramie, WY (US); PIRI TECHNOLOGIES, LLC, Laramie, WY (US)

(72) Inventors: Mohammad Piri, Laramie, WY (US); Youssra Rahham, Laramie, WY (US); Lamia Goual, Laramie, WY (US); Maziar Arshadi, Laramie, WY (US); Morteza Akbarabadi, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/538,494

(22) Filed: Nov. 30, 2021

(65) Prior Publication Data

US 2022/0169914 A1 Jun. 2, 2022

Related U.S. Application Data

(60) Provisional application No. 63/121,460, filed on Dec. 4, 2020, provisional application No. 63/119,429, filed on Nov. 30, 2020.

(51) Int. Cl.
*C09K 8/584* (2006.01)
*C09K 23/18* (2022.01)
(Continued)

(52) U.S. Cl.
CPC ............ *C09K 8/584* (2013.01); *C09K 23/017* (2022.01); *C09K 23/18* (2022.01); *C09K 23/42* (2022.01)

(58) Field of Classification Search
None
See application file for complete search history.

(56) References Cited

U.S. PATENT DOCUMENTS 4,293,428 A * 10/1981 Gale ..................... C09K 8/584 166/275
4,412,926 A * 11/1983 Nieh ..................... C09K 8/584 568/612
(Continued)

FOREIGN PATENT DOCUMENTS

CN 100564477 C * 12/2009
CN 111944507 A 11/2020
(Continued)

OTHER PUBLICATIONS

H. Cander, "What Are Unconventional Resources? A Simple Definition Using Viscosity and Permeability", in: AAPG Annu. Conv. Exhib. Am. Assoc. Pet. Geol. Soc. Sediment. Geol., Tulsa, OK, USA,2012: pp. 1-3.
(Continued)

*Primary Examiner* — Silvana C Runyan
(74) *Attorney, Agent, or Firm* — Patterson + Sheridan, LLP

(57) ABSTRACT

Embodiments of the present disclosure generally relate to methods and formulations for enhanced oil recovery. In an embodiment, a method for treating oil-containing porous media for oil recovery includes introducing oil-containing porous media with a surfactant formulation described herein. Methods can be utilized for, e.g., wettability reversal or oil recovery. Surfactant formulations are also described.

13 Claims, 17 Drawing Sheets

| Mineral | Area Percent |
|---|---|
| Dolomite | 68.13 |
| Quartz | 23.16 |
| Pores | 5.44 |
| Calcite | 1.66 |
| Unclassified | 0.94 |
| K-Feldspar | 0.22 |
| Illite | 0.19 |
| Trace Minerals | 0.16 |
| Apatite | 0.046 |
| Muscovite | 0.023 |
| Rutile | 0.021 |
| Gypsum/Anhydrite | 0.0093 |
| Biotite | 0.0072 |
| Pyrite | 0.0055 |

(51) Int. Cl.
*C09K 23/42* (2022.01)
*C09K 23/00* (2022.01)

(56) References Cited

U.S. PATENT DOCUMENTS

| | | | | |
|---|---|---|---|---|
| 4,457,373 | A * | 7/1984 | Balzer | C09K 8/584 166/275 |
| 7,854,263 | B2 | 12/2010 | Mas et al. | |
| 2003/0031788 | A1* | 2/2003 | Espin | C09K 8/88 427/230 |
| 2015/0007995 | A1* | 1/2015 | Livescu | E21B 21/00 166/305.1 |
| 2015/0329767 | A1 | 11/2015 | Vaughn et al. | |
| 2016/0137904 | A1 | 5/2016 | Drake et al. | |
| 2016/0152943 | A1 | 6/2016 | Kohr et al. | |
| 2016/0251568 | A1* | 9/2016 | Do | C09K 8/86 166/270.1 |
| 2018/0209260 | A1 | 7/2018 | Hwang et al. | |
| 2020/0071600 | A1* | 3/2020 | Farmer | C09K 8/588 |
| 2021/0108132 | A1* | 4/2021 | Trabelsi | C09K 8/604 |
| 2023/0183549 | A1* | 6/2023 | Swanson | E21B 43/16 166/270.1 |

FOREIGN PATENT DOCUMENTS

| | | | |
|---|---|---|---|
| JP | H066701 | B2 | 1/1994 |
| JP | 2019507198 | A | 3/2019 |
| WO | 2019200283 | A1 | 10/2019 |

OTHER PUBLICATIONS

M.D. Jackson, D. Al-Mahrouqi, J. Vinogradov, Zeta potential in oil-water-carbonate systems and its impact on oil recovery during controlled salinity water-flooding, Sci. Rep. 6 (2016) 1-13.
H.D. Klemme, G.F. Ulmishek, Effective petroleum source rocks of the world: stratigraphic distribution and controlling depositional factors, Am. Assoc. Pet. Geol. Bull. 75 (1991) 1809-1851.
P. Kathel, K.K. Mohanty, Wettability alteration in a tight oil reservoir, Energy and Fuels. 27 (2013) 6460-6468.
A.O. Gbadamosi, R. Junin, M.A. Manan, A. Agi, A.S. Yusuff, oil recovery: recent advances and prospects, Springer Berlin Heidelberg, 2019.
V. Mirchi, S. Saraji, L. Goual, M. Piri, Dynamic interfacial tension and wettability of shale in the presence of surfactants at reservoir conditions, Fuel. 148 (2015) 127-138.
U.S. Buckley, K. Takamura, N.R. Morrow, Influence of Electrical Surface Charges on the Wetting Properties of Crude Oils, SPE Reserv. Eng. (1989) 332-340.
K. Kumar, E.K. Dao, K.K. Mohanty, Atomic Force Microscopy Study of Wettability Alteration by Surfactants, SPE Int. Symp. Oilf. Chem. Proc. (2008) 2-5.
U.S. Buckley, Y. Liu, Some mechanisms of crude oil/brine/solid interactions, J. Pet. Sci. Eng. 20 (1998) 155-160.
T.M. Okasha, A.A.A.S. Aramco, S. Arabia, Investigation of the Effect of Temperature and Pressure on Interfacial Tension and Wettability of Shu ' aiba reservoir , Saudi Arabia, (2018) 3929.
D.C. Standnes, T. Austad, Wettability alteration in chalk 1. Preparation of core material and oil properties, J. Pet. Sci. Eng. 28 (2000) 111-121.
L.H. Sun, W.D. Liu, C.L. Sun, The adsorption property of wettability reversal surfactant, Adv. Mater. Res. 233-235 (2011) 2051-2055.
M. Salehi, S.J. Johnson, J.T. Liang, Mechanistic study of wettability alteration using surfactants with applications in naturally fractured reservoirs, Langmuir. 24 (2008) 14099-14107.
Acharya et al. "Ammonium Chloride as Surfactant for Heat Transfer Enhancement in Pool Boiling" IACSIT International Journal of Engineering and Technology. Jun. 2011, vol. 3, p. 323-326; p. 323.
J.J. Sheng, Comparison of the effects of wettability alteration and IFT reduction on oil recovery in carbonate reservoirs, Asia-Pacific J. Chem. Eng. 8 (2013) 154-161.
R. Gupta, K. Mohan, K.K. Mohanty, Surfactant screening for wettability alteration in oil-wet fractured carbonates, Proc.—SPE Annu. Tech. Conf. Exhib. 5 (2009) 3270-3290.
Y. Wu, P.J. Shuler, M. Blanco, Y. Tang, W.A. Goddard, An experimental study of wetting behavior and surfactant EOR in carbonates with model compounds, Spe J. 13 (2008) 26-34.
J.O. Alvarez, D.S. Schechter, Application of wettability alteration in the exploitation of unconventional liquid resources, Pet. Explor. Dev. 43 (2016) 832-840.
P. Somasundaran, L. Zhang, Adsorption of surfactants on minerals for wettability control in improved oil recovery processes, J. Pet. Sci. Eng. 52 (2006) 198-212.
B.F. Hou, Y.F. Wang, Y. Huang, Mechanistic study of wettability alteration of oil-wet sandstone surface using different surfactants, Appl. Surf. Sci. 330 (2015) 56-64.
S. Kumar, P. Panigrahi, R.K. Saw, A. Mandal, Interfacial Interaction of Cationic Surfactants and Its Effect on Wettability Alteration of Oil-Wet Carbonate Rock, Energy and Fuels. 30 (2016) 2846-2857.
D.C. Standnes, T. Austad, Wettability alteration in chalk 2. Mechanism for wettability alteration from oil-wet to water-wet using surfactants, J. Pet. Sci. Eng. 28 (2000) 123-143.
J.O. Alvarez, I.W.R. Saputra, D.S. Schechter, Potential of Improving Oil Recovery with Surfactant Additives to Completion Fluids for the Bakken, Energy and Fuels. 31 (2017) 5982-5994.
X. Xie, W.W. Weiss, Z. Tong, N.R. Morrow, Improved oil recovery from carbonate reservoirs by chemical stimulation, SPE—DOE Improv. Oil Recover. Symp. Proc. (2005) 17-21.
W.W. Weiss, X. Xie, Oilfield surfactants improve recovery by imbibition, Proc.—SPE Int. Symp. Oilf. Chem. (2007) 508-520.
K. Kumar, E.K. Dao, K.K. Mohanty, Atomic force microscopy study of wettability alteration, SPE Int. Symp. Oilf. Chem. Proc. (2005).
J.O. Alvarez, A. Neog, A. Jais, D.S. Schechter, Impact of surfactants for wettability alteration in stimulation fluids and the potential for surfactant EOR in unconventional liquid reservoirs, Soc. Pet. Eng.—SPE USA Unconv. Resour. Conf. 2014. (2014) 468-485.
D.C. Standnes, L.A.D. Nogaret, H.L. Chen, T. Austad, An evaluation of spontaneous imbibition of water into oil-wet carbonate reservoir cores using a nonionic and a cationic surfactant, Energy and Fuels. 16 (2002) 1557-1564.
T. Austad, D.C. Standnes, Spontaneous imbibition of water into oil-wet carbonates, J. Pet. Sci. Eng. 39 (2003) 363-376.
P. Chen, K.K. Mohanty, Wettability alteration in high temperature carbonate reservoirs, Spe -Doe Improv. Oil Recover. Symp. Proc. 3 (2014) 1359-1378.
D. Wang, R. Butler, H. Liu, S. Ahmed, Surfactant formulation study for Bakken shale imbibition, Proc.—SPE Annu. Tech. Conf. Exhib. 1 (2011) 545-558.
P. Zhang, T. Austad, Wettability and oil recovery from carbonates: Effects of temperature and potential determining ions, Colloids Surfaces A Physicochem. Eng. Asp. 279 (2006) 179-187.
M.A. Sohal, G. Thyne, E.G. Søgaard, Review of Recovery Mechanisms of Ionically Modified Waterflood in Carbonate Reservoirs, Energy and Fuels. 30 (2016) 1904-1914.
S. Das, Q. Nguyen, P.D. Patil, W. Yu, R.T. Bonnecaze, Wettability Alteration of Calcite by Nonionic Surfactants, Langmuir. 34 (2018) 10650-10658.
D.C. Standnes, T. Austad, Wettability alteration in carbonates: Low-cost ammonium surfactants based on bio- derivatives from the coconut palm as active chemicals to change the wettability form oil-wet to water-wet conditions, Colloids Surfaces A Physicochem. Eng. Asp. 218 (2003) 161-173.
L. Zhang, Z.L. Wang, Z.Q. Li, L. Zhang, Z.C. Xu, S. Zhao, J.Y. Yu, Wettability of a quartz surface in the presence of four cationic surfactants, Langmuir. 26 (2010) 18834-18840.
Y. Wang, H. Xu, W. Yu, B. Bai, X. Song, J. Zhang, Surfactant induced reservoir wettability alteration: Recent theoretical and experimental advances in enhanced oil recovery, Pet. Sci. 8 (2011) 463-476.
V. Mirchi, M.J. Sabti, M. Piri, L. Goual, Microscale Investigation of the Impact of Surfactant Structure on the Residual Trapping in Natural Porous Media, Ind. Eng. Chem. Res. 58 (2019) 9397-9411.

(56) References Cited

OTHER PUBLICATIONS

C.S. Vijapurapu, D.N. Rao, Compositional effects of fluids on spreading, adhesion and wettability in porous media, Colloids Surfaces A Physicochem. Eng. Asp. 241 (2004) 335-342.
A. Seethepalli, B. Adibhatla, K.K. Mohanty, Physicochemical interactions during surfactant flooding of fractured carbonate reservoirs, Spe J. 9 (2004) 411-418.
V. Mirchi, S. Saraji, M. Akbarabadi, L. Goual, M. Piri, A Systematic Study on the Impact of Surfactant Chain Length on Dynamic Interfacial Properties in Porous Media: Implications for Enhanced Oil Recovery, Ind. Eng. Chem. Res. 56 (2017) 13677-13695.
S. Saraji, L. Goual, M. Piri, H. Plancher, Wettability of Supercritical Carbon Dioxide/Water/Quartz Systems: Simultaneous Measurement of Contact Angle and Interfacial Tension at Reservoir Conditions, Langmuir. 29 (2013) 6856-6866.
M.J. Blunt, Physically-based network modeling of multiphase flow in intermediate-wet porous media, J. Pet. Sci. Eng. 20 (1998) 117-125.
B. Gao, M.M. Sharma, A new family of anionic surfactants for enhanced-oil-recovery applications, SPE J. 18 (2013) 829-840.
S. Pal, M. Mushtaq, F. Banat, A.M. Al Sumaiti, Review of surfactant-assisted chemical enhanced oil recovery for carbonate reservoirs: challenges and future perspectives, Pet. Sci. 15 (2018) 77-102.
Mitra et al. "Phase behavior, interfacial composition and thermodynamic properties of mixed surfactant (CTAB and Brij-58) derived w/o microemulsions with 1-butanol and 1-pentanol as cosurfactants and n-heptane and n-decane as oils" Journal of Colloid and Interface Science. Apr. 7, 2006 (07.04.2006) vol. 300, p. 755-764; p. 755.
International Search Report and Written Opinion dated Mar. 30, 2022 for Application No. PCT/US21/61208.
D.C. Standnes, T. Austad, Wettability alteration in carbonates: Interaction between cationic surfactant and carboxylates as a key factor in wettability alteration from oil-wet to water-wet conditions, Colloids Surfaces A Physicochem. Eng. Asp. 216 (2003) 243-259.
K. GmbH, Spinni.g drop tensiometer, (n.d.). https://www.kruss-scientific.com/services/educationtheory/glossary/pendant-drop/.
Japanese Office Action dated Aug. 13, 2024 for Application No. 2023-533231.
Canadian Office Action dated Aug. 5, 2024 for Application No. 3,200,507.
Brazilian Office Action dated Jul. 30, 2024 for Application No. BR1120230105390.
Extended European Search Report dated Sep. 11, 2024 for Application No. 21899230.3.
Translation of Saudi Arabian Office Action for Application No. 523440968 dated Sep. 2, 2024.
J.N. Israelachvili, Intermolecular and Surface forces, Academic Press, 2011, pp. 429-438.

* cited by examiner

| Mineral | Area Percent |
|---|---|
| Dolomite | 68.13 |
| Quartz | 23.16 |
| Pores | 5.44 |
| Calcite | 1.66 |
| Unclassified | 0.94 |
| K-Feldspar | 0.22 |
| Illite | 0.19 |
| Trace Minerals | 0.16 |
| Apatite | 0.046 |
| Muscovite | 0.023 |
| Rutile | 0.021 |
| Gypsum/Anhydrite | 0.0093 |
| Biotite | 0.0072 |
| Pyrite | 0.0055 |

METHODS AND FORMULATIONS FOR TREATING OIL-CONTAINING POROUS MEDIA FOR OIL RECOVERY

CROSS-REFERENCE TO RELATED APPLICATIONS

This application claims benefit of U.S. Provisional Patent Application No. 63/119,429, filed Nov. 30, 2020, and U.S. Provisional Patent Application No. 63/121,460, filed Dec. 4, 2020, each of which is herein incorporated by reference in its entirety.

FIELD

Embodiments of the present disclosure generally relate to methods and formulations for enhanced oil recovery, and more specifically to methods and formulations for, e.g., treating oil-containing porous media for oil recovery or wettability reversal.

DESCRIPTION OF RELATED ART

A challenge facing oil production from unconventional ultra-tight reservoirs is the reservoirs' complicated mineralogy and the small interstitial pore sizes of rocks present in the reservoirs. The diverse array of minerals present include clastic minerals like quartz, feldspar, calcite ($CaCO_3$), and/or dolomite ($MgCO_3$), as well as impurities such as clays, anhydrite, apatite, and organic matter. The small interstitial pore sizes, ranging from 1-3 nm to 400-750 nm, can lead to lead to high capillary pressures, which act as a barrier to fluid mobility in ultra-tight reservoirs, thus hindering oil recovery. Horizontal drilling and hydraulic fracturing processes to enhance the reservoir permeability overcome the barrier only partially. Moreover, the majority of unconventional reservoirs, i.e. shale oil, tight oil, oil shales, et cetera, are generally classified as oil-wet to mixed-wet carbonates. The strongly oil-wet characteristics of the reservoir has precluded recovery of oil.

Chemical flooding techniques have been utilized to improve oil production from conventional reservoirs. For example, surfactants have been used as enhanced oil recovery agents to decrease interfacial tension (IFT) between oil and brine, leading to an increase in surface area of the oil droplets (smaller droplets) and higher oil production in conventional reservoirs. However, chemical flooding techniques in unconventional reservoirs is limited. When chemical flooding has been used, the amount of oil produced from the reservoirs is inadequate.

There is a need for new and improved methods and formulations for enhanced oil recovery in, e.g., oil-containing porous media.

SUMMARY

Embodiments of the present disclosure generally relate to methods and formulations for enhanced oil recovery, and more specifically to methods and formulations for, e.g., treating oil-containing porous media for oil recovery or wettability reversal.

In an embodiment, a surfactant formulation is provided. The surfactant formulation includes a surfactant A, a surfactant B, or a combination thereof:

(A)

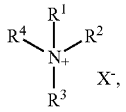

(B)

$R^5(OCH_2CH_2)_nOH$, wherein: each of $R^1$, $R^2$, $R^3$, and $R^4$ is, independently, H or an alkyl group having 1 to 40 carbon atoms, $R^5$ is an alkyl group having 1 to 40 carbon atoms, n is 1 to 45, and X is a halide.

In another embodiment, a method for reversing a wettability of an oil-containing porous media is provided. The method includes introducing the oil-containing porous media with a surfactant formulation, the oil-containing porous media being weakly water-wet or oil-wet, the surfactant formulation comprising a surfactant A, a surfactant B, or a combination thereof:

(A)

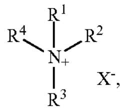

(B)

$R^5(OCH_2CH_2)_nOH$, wherein: each of $R^1$, $R^2$, and $R^3$ is methyl; each of $R^4$ and $R^5$ is, independently, an alkyl group having 4 to 20 carbon atoms; n is 1 to 45; and X is fluoride, chloride, bromide, or iodide. The method further includes reversing the wettability of the oil-containing porous media from a weakly water-wet or oil-wet state to a water-wet state.

In another embodiment, a method for treating oil-containing porous media for oil recovery is provided. The method includes introducing the oil-containing porous media with a surfactant formulation, the surfactant formulation comprising a surfactant A, a surfactant B, or a combination thereof:

(A)

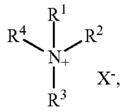

(B)

$R^5(OCH_2CH_2)_nOH$, wherein: at least one surfactant A is present, and for each surfactant A present, each of $R^1$, $R^2$, and $R^3$ is methyl, $R^4$ is an alkyl group having 4 to 14 carbon atoms, and X is, independently, bromide or chloride; or at least one surfactant B is present, and for each surfactant B present, $R^5$ is, independently, an alkyl group having 6 to 15 carbon atoms, and n is, independently, 1 to 20. The method further includes recovering oil from the oil-containing porous media.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
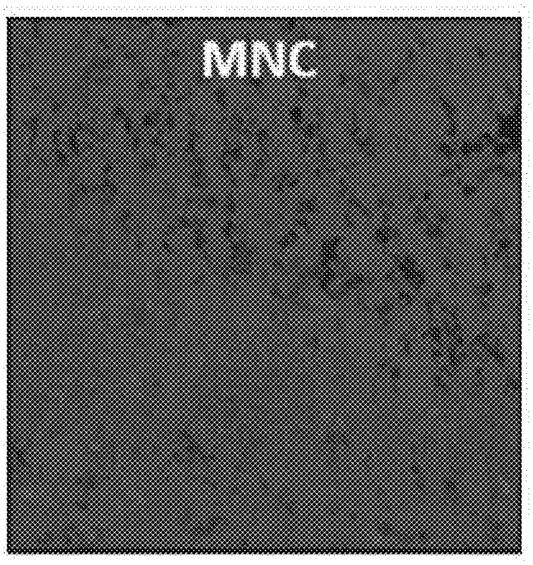
FIG. 1A is an exemplary back scattered electron (BSE) image obtained of a Minnesota Northern Cream (MNC) sample useful with at least one embodiment of the present disclosure.

Embodiments of the present disclosure generally relate to methods and formulations for enhanced oil recovery, and more specifically to methods and formulations for, e.g., treating oil-containing porous media for oil recovery or wettability reversal. As discussed above, recovery from oil-wet reservoirs is severely limited. The inventors have found new and improved surfactants, surfactant formulations, and methods of using such surfactants and surfactant formulations for, e.g., improving oil recovery from such reservoirs. In some embodiments, the improved oil recovery may be facilitated by at least partially converting an oil-wet or mixed-wet porous media to a more water-wet state using a surfactant or surfactant formulation described herein.

For the purposes of this present disclosure, and unless otherwise specified, the term "alkyl" or "alkyl group" interchangeably refers to a group consisting of hydrogen and carbon atoms only. An alkyl group can be substituted or unsubstituted, saturated or unsaturated, linear or branched, cyclic or acyclic, aromatic or non-aromatic, or combinations thereof. When a number of carbon atoms of an alkyl group is specified herein, it is intended that the number refers to the exact number of carbon atoms, or range of carbon atoms, that is specified. In other words, when a number of carbon atoms (or range thereof) is specified for an alkyl group, it is not intended that the alkyl group comprises that specified number of carbon atoms, but rather that the alkyl group contains the specified number. For example, if an alkyl is specified to have or to contain 4 to 8 carbon atoms, an alkyl group having or containing 12 carbon atoms would not qualify; rather, only an alkyl group that contains 4, 5, 6, 7, or 8 carbon atoms would qualify. The same concept applies to "n" in reference to the number of $CH_2CH_2O$ groups, and number of $CH_2$ groups in an alkyl group.

In some embodiments, the number of carbon atoms of an alkyl group can be related to the number of methylene ($CH_2$) groups. For example, if the alkyl group is linear, and the alkyl group has 13 carbon atoms, then the number of methylene groups can be specified as 12 (with one $CH_3$ group). As such, when the alkyl group is linear, the number of methylene groups can be derived as the number of carbon atoms (e.g., 8) minus 1 (e.g., 7). Therefore, the various numbers of carbon atoms disclosed herein for linear alkyl chains can be used to specify the number of methylene groups via the equation Q=S−1, where S is the number of carbon atoms and Q is the number of methylene groups.

Reference to an alkyl group without specifying a particular isomer (e.g., butyl) expressly discloses all isomers (e.g., n-butyl, iso-butyl, sec-butyl, and tert-butyl). For example, reference to an alkyl group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions that are appropriate for preparation of salts of for a given application. In solution, the salts can exist in their ionic form.

Surfactants

Embodiments of the present disclosure relate to surfactants for, e.g., oil recovery from oil-containing porous media or wettability reversal of oil-containing porous media. A surfactant can be used alone or in a surfactant formulation.

In some embodiments, the surfactant has the formula (A):

(A)

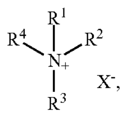

wherein:

- each of $R^1$, $R^2$, $R^3$, and $R^4$ is, independently, H or an alkyl group; and
- X is a halide (e.g., F, Cl, Br, or I), an oxide, a carbonate, a nitrate, a sulfate, a sulfonate, a tosyl, a trifluoromethesulfonate, a phosphate, a phosphonate, a hydroxide, or combinations thereof.

For purposes of the present disclosure, the terms "surfactant of formula (A)" and "surfactant A" are used interchangeably. One or more surfactants of formula (A) can be utilized together according to some embodiments. In at least one embodiment, each of $R^1$, $R^2$, $R^3$, and $R^4$ is, independently, hydrogen or an alkyl group having any suitable number of carbon atoms, such as from about 1 to about 40 carbon atoms. Each of $R^1$, $R^2$, $R^3$, and $R^4$ can, independently, be substituted or unsubstituted, saturated or unsaturated, linear or branched, cyclic or acyclic, and/or aromatic or non-aromatic.

In some examples, the number of carbon atoms can be 1, 2, 3, 4, 5, 6, 7, 8, 9, 10, 11, 12, 13, 14, 15, 16, 17, 18, 19, or 20. Each of the foregoing numbers can be preceded by the word "about," "at least about," "less than about," or "more than about," and any of the foregoing numbers can be used singly to describe an open-ended range or in combination to describe a close-ended range. For example, the number of carbon atoms can be from about 5 to about 10, from about 4 to about 12, from about 8 to about 10, about 12 or less, or about 6 or more.

In some embodiments, each of $R^1$, $R^2$, and $R^3$ is a methyl group ($CH_3$), and $R^4$ is an alkyl group, such as a linear or branched alkyl group. $R^4$ can be an alkyl group having a number of carbon atoms that is from about 1 to about 20, such as from about 4 to about 20 carbon atoms, from about 4 to about 18 carbon atoms, from about 4 to about 12 carbon atoms, from about 6 to about 12 carbon atoms, from about 6 to about 10 carbon atoms, from about 8 to about 12 carbon atoms, from about 8 to about 10 carbon atoms, from about 8 to about 16 carbon atoms, about 8 carbon atoms, about 12 carbon atoms, about 16 carbon atoms, or about 18 carbon atoms. In some embodiments, $R^4$ in the surfactant of formula (A) is an alkyl group having about 7, about 11, about 15, or about 17 $CH_2$ groups, or $R^4$ in the surfactant of formula (A) is an alkyl group having about 8, about 12, about 16, or about 18 carbon atoms.

In some embodiments, the surfactant of formula (A) includes trimethyloctylammonium bromide (TOAB), trimethyloctylammonium chloride (TOAC), dodecyltrimethylammonium bromide (DTAB), dodecyltrimethylammonium chloride (DTAC), cetyltrimethylammonium bromide (CTAB, also known as hexadecyltrimethylammonium bromide), cetyltrimethylammonium chloride (CTAC), trimethyloctadecylammonium bromide (TODAB), trimethyloctadecylammonium chloride (TSAC), or combinations thereof, in any suitable amounts or ratios. The surfactant of formula (A) can include TOAB, TOAC, CTAB, TSAC, or combinations thereof, in any suitable amounts or ratios. In some embodiments, the surfactant of formula (A) is selected from the group consisting of one or more of the aforementioned surfactants, including combinations of such surfactants in any suitable amounts or ratios.

The one or more surfactants can include a surfactant having the formula (B):

$$R^5(OCH_2CH_2)_nOH \quad (B),$$

wherein:

$R^5$ is an alkyl group; and n is a non-zero number that is from about 1 to about 45.

The terms "surfactant of formula (B)" and "surfactant B" are used interchangeably. One or more surfactants of formula (B) can be utilized together according to some embodiments. The alkyl group of formula (B), $R^5$, can be substituted or unsubstituted, saturated or unsaturated, linear or branched, cyclic or acyclic, aromatic or non-aromatic. In at least one embodiment, $R^5$ is independently an alkyl group having any suitable number of carbon atoms, such as from about 1 to about 40 carbon atoms. The number of carbon atoms of $R^5$ can be 1, 2, 3, 4, 5, 6, 7, 8, 9, 10, 11, 12, 13, 14, 15, 16, 17, 18, 19, or 20. Each of the foregoing numbers can be preceded by the word "about," "at least about," "less than about," or "more than about," and any of the foregoing numbers can be used singly to describe an open-ended range or in combination to describe a close-ended range. For example, the number of carbon atoms can be about 10 or less carbon atoms, from about 6 to about 8 carbon atoms, or from about 7 to about 14 carbon atoms. In some embodiments, $R^5$ in the surfactant of formula (B) is an alkyl group having a number of carbon atoms comprising, or is selected from the group consisting of, about 4 to about 8 carbon atoms, about 4 to about 11 carbon atoms, about 9 to about 11 carbon atoms, about 9 to about 14 carbon atoms, about 10 to about 14 carbon atoms, about 12 to about 14 carbon atoms, about 9 to about 11 carbon atoms, about 11 carbon atoms, and/or about 13 carbon atoms. In some embodiments, $R^5$ is an alkyl group having a number of carbon atoms comprising, or selected from the group consisting of, about 4 to about 20 carbon atoms, about 9 to about 11 carbon atoms, about 11 carbon atoms, about 13 carbons atoms, about 9 to about 14 carbon atoms, and/or about 12 to about 14 carbon atoms.

In at least one embodiment, n of the surfactant of formula (B) is 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45. Each of the foregoing numbers can be preceded by the word "about," "at least about," "less than about," or "more than about," and any of the foregoing numbers can be used singly to describe an open-ended range or in combination to describe a close-ended range. For example, n can be about 10 or less, about 3 to about 6, about 4 to about 8, about 16 to about 20, or about 18. In some embodiments, n of the surfactant of formula (B) is, or is selected from the group consisting of, about 2.5 to about 41, about 2.5 to about 10, about 3 to about 6, about 3 to about 10, about 15 to about 18, about 10 to about 20, about 2.5, about 3, about 5, about 6, about 7, about 8, about 9, about 10, about 12, about 15, about 18, about 20, about 30, about 31, or about 41.

In some embodiments, and when $R^5$ of formula (B) is an alkyl group having about 9 to about 11 carbon atoms, n is, or is selected from the group consisting of, about 2.5, about 6, and/or about 8. In some embodiments, and when $R^5$ of formula (B) is an alkyl group having about 11 carbon atoms, n is, or is selected from the group consisting of, about 3, about 5, about 7, and/or about 9. In some embodiments, and when $R^5$ of formula (B) is an alkyl group having about 13 carbon atoms, n is, or is selected from the group consisting of, about 6, about 9, about 12, about 18, and/or about 30. In some embodiments, and when $R^5$ of formula (B) is an alkyl group having about 12 to about 14 carbon atoms, n is, or is selected from the group consisting of, about 5, about 9, about 15, about 20, about 30, and/or about 40.

In some embodiments, n of the surfactant of formula (B) is, or is selected from the group consisting of, 2.5 to 41, 2.5 to 10, 3 to 6, 3 to 10, 15 to 18, 10 to 20, 2.5, 3, 5, 6, 7, 8, 9, 10, 12, 15, 18, 20, 30, 31, and/or 41. Each of the foregoing numbers can be preceded by the word "about," "at least about," "less than about," or "more than about," and any of the foregoing numbers can be used singly to describe an open-ended range or in combination to describe a close-ended range. In some embodiments, and when $R^5$ is an alkyl group having about 9 to about 11 carbon atoms, n is, or is selected from the group consisting of, about 2.5, about 6, and/or about 8. In some embodiments, and when $R^5$ is an alkyl group having about 11 carbon atoms, n is, or is selected from the group consisting of, about 3, about 5, about 7, and/or about 9. In some embodiments, and when $R^5$ is an alkyl group having about 13 carbon atoms, n is, or is selected from the group consisting of, about 3, about 6, about 9, about 12, about 18, and/or about 30. In some embodiments, and when $R^5$ is an alkyl group having about 12 to about 14 carbon atoms, n is, or is selected from the group consisting of, about 5, about 9, about 15, about 20, about 30, and/or about 40.

In some embodiments, in the surfactant of formula (B):

(1) $R^5$ is an alkyl group having about 13 carbon atoms, and/or n is about 18;

(2) $R^5$ is an alkyl group having about 13 carbon atoms, and/or n is about 3, about 6, about 9, about 12, about 18, or about 30;

(3) $R^5$ is an alkyl group having about 11 carbon atoms, and/or n is about 3, about 5, about 7, or about 9;

(4) $R^5$ is an alkyl group having about 9-11 carbon atoms, and/or n is about 2.5, about 6, or about 8; and/or (5) $R^5$ is an alkyl group having about 12-14 carbon atoms, and/or n is about 5, about 9, about 15, about 20, about 31, or about 41.

In some embodiments, the surfactant of formula (B) set forth herein encompasses the surfactant of formula (C):

$$CH_3(CH_2)_m(OCH_2CH_2)_nOH \quad (C),$$

wherein:

m is the number of methylene ($CH_2$) groups; and n is the number of ethylene oxide groups, such as those described for the surfactant of formula (B), such as from about 1 to about 45.

In some embodiments, and for the surfactant of formula (C), m is any suitable number such as 1, 2, 3, 4, 5, 6, 7, 8, 9, 10, 11, 12, 13, 14, 15, 16, 17, 18, or 19. Each of the foregoing numbers can be preceded by the word "about," "at least about," "less than about," or "more than about," and any of the foregoing numbers can be used singly to describe an open-ended range or in combination to describe a close-ended range. For example, m is, or is selected from the group consisting of, about 12, about 10, about 8 to about 10, and/or about 11 to about 13.

In some embodiments, and for the surfactant of formula (C), m is, or is selected from the group consisting of, about 2.5, about 3, about 5, about 6, about 7, about 8, about 9, about 12, about 15, about 18, about 20, about 30, about 31, and about 41. In some embodiments, in the surfactant of formula (C), m is about 12 and n is about 18. In some embodiments, and for the surfactant of formula (C), m is about 12 and n is about 3, about 6, about 9, about 12, about 18, or about 30. In some embodiments, in the surfactant of formula (C), m is about 10 and n is about 3, about 5, about 7, or about 9. In some embodiments, in the surfactant of formula (C), m is about 8 to about 10 and n is about 2.5, about 6, or about 8. In some embodiments, in the surfactant of formula (C), m is about 11 to about 13 and n is about 5, about 9, about 15, about 20, about 31, or about 41.

The group ($CH_3(CH_2)_m$) can be substituted or unsubstituted, saturated or unsaturated, linear or branched, cyclic or acyclic, aromatic or non-aromatic.

In some embodiments, in the surfactant of formula (C), n is 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45. Each of the foregoing numbers can be preceded by the word "about," "at least about," or "less than about," and any of the foregoing numbers can be used singly to describe an open-ended range or in combination to describe a close-ended range. For example, n is about 10 or less, about 3 to about 6, about 4 to about 8, about 16 to about 20, or about 18. In some embodiments, n in the surfactant of formula (C) is, or is selected from the group consisting of, about 2.5 to about 41, about 2.5 to about 10, about 3 to about 6, about 3 to about 10, about 15 to about 18, about 10 to about 20, about 2.5, about 3, about 5, about 6, about 7, about 8, about 9, about 10, about 12, about 15, about 18, about 20, about 30, about 31, and/or about 41.

In some embodiments, the surfactant of formula (B), or the surfactant of formula (C), includes MAKON® TD-n, BIO-SOFT® N1-n, BIO-SOFT® N91-n, or TERGITOL® 15-S-n, or combinations thereof, wherein n is defined elsewhere herein. In some embodiments, the surfactant of formula (B), or the surfactant of formula (C), includes MAKON TD-n, in which n is 3, 6, 9, 12, 18, or 30. In some embodiments, the surfactant of formula (B), or the surfactant of formula (C), includes BIO-SOFT N1-n, in which n is 3, 5, 7, or 9. In some embodiments, the surfactant of formula (B), or the surfactant of formula (C), includes BIO-SOFT N91-n, in which n is 2.5, 6, or 8. In some embodiments, the surfactant of formula (B), or the surfactant of formula (C), includes TERGITOL 15-S-n, in which n is 5, 9, 15, 20, 31, or 41. In some embodiments, the surfactant of formula (B), or the surfactant of formula (C), includes poly(ethylene glycol)tridecylether (POE), in which n is 18. The n for any of the aforementioned surfactants can be any of the options disclosed elsewhere herein, and n generally is the number of $OCH_2CH_2$ units.

In some embodiments, the surfactant of formula (B) can include tridecyl ethoxylated alcohols, poly(oxyethylene) alcohols, and/or secondary alcohol ethoxylates. Examples of tridecyl ethoxylated alcohols include poly(ethylene glycol) tridecyl ethers having the formula $CH_3(CH_2)_{12}(CH_2CH_2O)_nOH$ (where n=18) and/or $CH_3(CH_2)_{12}(CH_2CH_2O)_nOH$ (where n=3, 6, 9, 12, 18, and/or 30). Examples of poly(oxyethylene) alcohols include alcohols having the formula $CH_3(CH_2)_{10}(CH_2CH_2O)_nOH$ (where n=3, 5, 7, and/or 9) and/or $CH_3(CH_2)_{8-10}(CH_2CH_2O)_nOH$ (where n=2.5, 6, and/or 8). Examples of secondary alcohol ethoxylates include ethoxylates having the formula $CH_3(CH_2)_{11-13}(CH_2CH_2O)_nOH$ (where n=5, 9, 15, 20, 31, and/or 41). Other nonionic surfactants are contemplated.

Surfactant Formulation

Embodiments of the present disclosure also relate to surfactant formulations. Surfactant formulations can be introduced or added to an oil-containing reservoir or an oil-containing formation to, e.g., enhance oil recovery. In some embodiments, the surfactant formulations can be used to treat oil-containing porous media, alter the wettability of an oil-containing porous media, and combinations thereof.

The surfactant formulation can include one or more surfactants plus one or more other components. As used herein, a "formulation" can include component(s) of the formulation and/or reaction product(s) of two or more components of the formulation. The formulation can include ion(s) of one or more components of the formulation. The formulation can be prepared by any suitable mixing process.

In some embodiments, the surfactant of formula (A) is present in the surfactant formulation. Additionally, or alternatively, the surfactant of formula (A) is present in the surfactant formulation and the surfactant of formula (B) is not present in the surfactant formulation. Additionally, or alternatively, the surfactant of formula (B) is present in the surfactant formulation. Additionally, or alternatively, the surfactant of formula (B) is present in the surfactant formulation and the surfactant of formula (A) is not present in the surfactant formulation. Additionally, or alternatively, both the surfactant of formula (A) and the surfactant of formula (B) are present in the surfactant formulation.

In some embodiments, more than one surfactant of formula (A), more than one surfactant of formula (B), or combinations thereof is utilized in the surfactant formulation. For example, the surfactant formulation can include 2 surfactants of formula (A) and 1 surfactant of formula (B). As another example, the surfactant formulation can include 1 surfactant of formula (A) and 3 surfactants of formula (B). Many other iterations are contemplated.

In some embodiments, the surfactant formulation comprises a combination of a surfactant of formula (A) and a surfactant of formula (B), in which $R^5$ of the surfactant of formula (B) is an alkyl group having 12-14 carbon atoms and n is 15, and the surfactant of formula (A) includes cetyltrimethylammonium bromide, trimethyloctadecylammonium chloride, dodecyltrimethylammonium chloride, trimethyloctylammonium bromide, or combinations thereof. However, such combinations are merely exemplary, and any surfactant of formula (A) and any surfactant of formula (B) disclosed elsewhere herein can be combined in any manner. For example, $R^5$ of the surfactant of formula (B) can be an alkyl group having 10 to 15 carbon atoms and n is 12-18, and this surfactant of formula (B) can be combined with any surfactant of formula (A) disclosed herein.

In some embodiments, the surfactant formulation includes a combination of a surfactant of formula (A) and a surfactant of formula (B), in which $R^5$ of the surfactant of formula (B) is an alkyl group having 9-11 carbon atoms and n is 8, and the surfactant of formula (A) includes cetyltrimethylammonium bromide, trimethyloctadecylammonium chloride, dodecyltrimethylammonium chloride, trimethyloctylammonium bromide, or combinations thereof. However, such combinations are merely exemplary, and any surfactant of formula (A) and any surfactant of formula (B) disclosed elsewhere herein can be combined in any manner. For example, $R^5$ of the surfactant of formula (B) can be an alkyl group having 7 to 13 carbon atoms and n is 5-10, and this surfactant of formula (B) can be combined with any surfactant of formula (A) disclosed herein.

In some embodiments, the surfactant formulation includes a combination of a surfactant of formula (A) and a surfactant of formula (B), in which $R^5$ of the surfactant of formula (B) is an alkyl group having 13 carbon atoms and n is 18, and the surfactant of formula (A) includes cetyltrimethylammonium bromide, trimethyloctadecylammonium chloride, dodecyltrimethylammonium bromide, dodecyltrimethylammonium chloride, trimethyloctylammonium bromide, trimethyloctylammonium chloride, or combinations thereof. However, such combinations are merely exemplary, and any surfactant of formula (A) and any surfactant of formula (B) disclosed elsewhere herein can be combined in any manner. For example, $R^5$ of the surfactant of formula (B) can be an alkyl group having 9 to 15 carbon atoms and n is 15-21, and this surfactant of formula (B) can be combined with any surfactant of formula (A) disclosed herein.

In some embodiments, the surfactant formulation comprises a combination of a surfactant of formula (A) and a surfactant of formula (B), in which $R^5$ of the surfactant of formula (B) is an alkyl group having 13 carbon atoms and n is 18, and the surfactant of formula (A) includes trimethyloctylammonium bromide, trimethyloctylammonium chloride, dodecyltrimethylammonium bromide, dodecyltrimethylammonium chloride, or combinations thereof.

The one or more surfactants can each be, independently, in its ionic form or neutral form depending on, e.g., the pH of the surfactant formulation, the conditions of the reservoir, et cetera.

In some embodiments, the surfactant formulation includes a plurality of surfactants, for example two or more surfactants, such as three or more surfactants, and so forth. The amount of each surfactant of the surfactant formulation can be any suitable amount. In some examples, a volume ratio (v/v) of the surfactant of formula (A) to the surfactant of formula (B) ranges from volume $ratio_1$ to volume $ratio_2$, where each of volume $ratio_1$ to volume $ratio_2$ is 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or 99:1, so long as volume $ratio_1$<volume $ratio_2$. Each of the foregoing numbers can be preceded by the word "about," "at least about," "less than about," or "more than about," and any of the foregoing numbers can be used singly to describe an open-ended range or in combination to describe a close-ended range. For example, the volume ratio of the surfactant of formula (A) to the surfactant of formula (B) is about 50:50, about 40:60 to about 60:40, about 25:75, or about 75:25. In some embodiments, the volume ratio of the surfactant of formula (A) to the surfactant of formula (B) is about 1:99 to about 99:1, about 5:95 to about 95:5, about 10:90 to about 90:10, about 25:75 to about 75:25, about 40:60 to about 60:40, about 55:45 to about 45:55, or about 50:50. Other ratios are contemplated.

In some embodiments, the surfactant formulation includes a combination of a surfactant of formula (A) and a surfactant of formula (B), in which the surfactant of formula (A) is cetyltrimethylammonium bromide and $R^5$ of the surfactant of formula (B) is an alkyl group having 12-14 carbon atoms and n is 15, and in which the volume ratio of the surfactant of formula (A) to the surfactant of formula (B) is about 40:60 to about 60:40. However, any other surfactant of formula (A) disclosed herein may be employed in this combination, and any other surfactant of formula (B) with other carbon atom number and n number is also contemplated herein. Moreover, any other volume ratio of these two surfactants may be employed. For example, in some embodiments, the surfactant formulation includes a combination of the surfactant of formula (A) and the surfactant of formula (B), in which the surfactant of formula (A) is cetyltrimethylammonium bromide or cetyltrimethylammonium chloride and $R^5$ of the surfactant of formula (B) is an alkyl group having 10-16 carbon atoms and n is 12-18, and in which the volume ratio of the surfactant of formula (A) to the surfactant of formula (B) is about 55:45 to about 45:55.

In some embodiments, the surfactant formulation includes a combination of a surfactant of formula (A) and a surfactant of formula (B), in which the surfactant of formula (A) is trimethyloctadecylammonium chloride and the surfactant of formula (B) is either of the following two options: (1) $R^5$ of the surfactant of formula (B) is an alkyl group having 13 carbon atoms and n is 18, or (2) $R^5$ is an alkyl group having 9-11 carbon atoms and n is 8, and, in which the volume ratio of the surfactant of formula (A) to the surfactant of formula (B) is about 40:60 to about 60:40. However, any other surfactant of formula (A) disclosed herein may be employed in this combination, and any other surfactant of formula (B) with other carbon atom number and n number is also contemplated herein. Moreover, any other volume ratio of these two surfactants may be employed. For example, in some embodiments, the surfactant formulation includes a combination of the surfactant of formula (A) and the surfactant of formula (B), in which the surfactant of formula (A) is trimethyloctadecylammonium chloride or trimethyloctadecylammonium bromide and the surfactant of formula (B) is either of the following two options: (1) $R^5$ of the surfactant of formula (B) is an alkyl group having 10-14 carbon atoms and n is 15-22, or (2) $R^5$ is an alkyl group having 8-13 carbon atoms and n is 6-10 and, in which the volume ratio of the surfactant of formula (A) to the surfactant of formula (B) is about 45:55 to about 55:45.

In some embodiments, the surfactant formulation includes a total amount of the surfactant (e.g., one or more surfactants) in any suitable amount. A weight percent (wt %) of the total amount of the surfactant in the surfactant formulation, based on a total weight of the surfactant formulation, ranges from $wt_1$ to $wt_2$, where each of $wt_1$ and $wt_2$ is 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.45, 0.5, 0.55, 0.6, 0.65, 0.7, 0.75, 0.8, 0.85, 0.9, 0.95, or 1 so long as $wt_1<wt_2$. Each of the foregoing numbers can be preceded by the word "about," "at least about," "less than about," or "more than about" and any of the foregoing numbers can be used singly to describe an open-ended range or in combination to describe a close-ended range. For example, the amount (wt %) of surfactant in the surfactant formulation is about 0.03 or more, about 0.08 to about 0.12, about 0.3 or less, or at least about 0.05. Any of the foregoing amounts can apply to a single surfactant (e.g., only the surfactant of formula (A)), the total amount of a specified combination of surfactants (e.g., the surfactant of formula (A) and the surfactant of formula (B)), or the total amount of all surfactants present in the surfactant formulation, as will be clear from context. In some embodiments, the surfactant formulation comprises at least one of the surfactant of formula (A) and at least one of the surfactant of formula (B), and the total amount of the surfactant of formula (A), if present, and the surfactant of formula (B), if present, is about 0.01 wt % to about 1 wt %, based on the total weight of the surfactant formulation. The total weight of the surfactant formulation does not exceed 100 wt %.

In some examples, a total amount of the surfactant (e.g., one or more surfactants) in the surfactant formulation can be any suitable amount such as from about 0.01 wt % to about 5 wt %, such as from about 0.05 wt % to about 3 wt %, such as from about 0.075 wt % to about 1 wt %, such as from about 0.1 wt % to about 1 wt %, such as from about 0.2 wt % to about 0.9 wt %, such as from about 0.3 wt % to about 0.8 wt %, such as from about 0.4 wt % to about 0.7 wt %, such as from about 0.5 wt % to about 0.6 wt %, based on the total weight of the surfactant formulation. In at least one embodiment, the total amount of surfactant in the surfactant formulation can be less than about 1 wt %, such as less than about 0.5 wt %, such as less than about 0.25 wt %, such as less than about 0.2 wt %, such as less than about 0.15 wt %, such as less than about 0.1 wt %. Higher and lower total amounts of surfactant are contemplated.

As described above, the surfactant formulation can include one or more other components besides the surfactant (s). The one or more other components of the surfactant formulation can include a salt (e.g., NaCl, $CaCl_2$, $MgCl_2$, $Mg_2SO_4$, $Na_2SO_4$), a brine (e.g., a brine composition or a low salinity brine composition), a polymer (e.g., poly(vinyl alcohol), xantham gum, polyacrylamide), alkaline materials (e.g., NaOH and/or $Na_2CO_3$), a hydrophobe, an alcohol (e.g., sec-butyl alcohol), co-surfactants (such as alcohols, among other chemicals), or combinations thereof).

The surfactant formulation can include a brine composition. As used herein, a "composition" can include component(s) of the composition and/or reaction product(s) of two or more components of the composition. The composition can include ion(s) of one or more components of the composition. The composition can be prepared by any suitable mixing process.

The brine composition includes one or more salts. The one or more salts include a cation and an anion. The cation and/or the anion can be monoatomic or polyatomic. Monoatomic cations can include an alkali metal (e.g., Li, K, Rb, and Cs), an alkaline earth metal (e.g., Be, Mg, Ca, Sr, and Ba), a transition metal (Fe, Zn, Mn), or combinations thereof. Polyatomic cations can include such as ammonium ($NR_4^+$, wherein each R is independently $H$ or alkyl), pyridinium, or combinations thereof. Anions can include one or more elements from Group 15-Group 17 of the periodic table of the elements, such as N, P, S, O, F, Cl, Br, I, or combinations thereof. Monoatomic anions can include a halide (F, Cl, Br, and I), oxides, or combinations thereof. Polyatomic anions can include a carbonate, a nitrate, a sulfate, a sulfonate, a tosyl, a trifluoromethesulfonate, a phosphate, a phosphonate, a hydroxide, or combinations thereof. Other ions are contemplated.

In a solution or suspension, the salt(s) may exist as one or more ions. For example, one or more anions (e.g., Cl, Br, I, Sr, et cetera) and one or more cations (e.g., Na, K, Ca, Mg, et cetera) may exist in the solution or suspension.

Illustrative, but non-limiting, examples of salts include sodium chloride (NaCl), sodium bromide (NaBr), sodium iodide (NaI), sodium sulfate ($Na_2SO_4$), potassium chloride (KCl), potassium bromide (KBr), potassium iodide (KI), potassium nitrate ($KNO_3$), calcium chloride ($CaCl_2$), calcium bromide ($CaBr_2$), calcium iodide ($CaI_2$), calcium sulfate ($CaSO_4$), calcium oxide (CaO), magnesium chloride ($MgCl_2$), magnesium sulfate ($Mg_2SO_4$), and/or $Mg(OH)_2$, among others. One or more of these salts can be hydrates, e.g., hexahydrates. In some embodiments, the brine composition comprises calcium chloride, magnesium chloride, and/or ions thereof. In some embodiments, the brine composition comprises sodium chloride, calcium chloride, magnesium chloride, and/or ions thereof.

The brine composition can include any suitable total dissolved solids (TDS) content of any suitable amount, excluding the presence of any surfactants. The TDS can be based on the aforementioned salts. In some embodiments, the TDS content (ppm) of the brine composition is from about 10,000 ppm to about 1,000,000 ppm. In at least one embodiment, the TDS content of the brine composition ranges from $TDS_1$ to $TDS_2$, where each of $TDS_1$ to $TDS_2$ (in ppm) is 10,000, 20,000, 30,000, 40,000, 50,000, 60,000, 70,000, 80,000, 90,000, 100,000, 120,000, 140,000, 160,000, 180,000, 200,000, 220,000, 240,000, 260,000, 280,000, 300,000, 320,000, 340,000, 360,000, 380,000, 400,000, 420,000, 440,000, 460,000, 480,000, 500,000, 520,000, 540,000, 560,000, 580,000, 600,000, 620,000, 640,000, 660,000, 680,000, 700,000, 720,000, 740,000, 760,000, 780,000, 800,000, 820,000, 840,000, 860,000, 880,000, 900,000, 920,000, 940,000, 960,000, 980,000, or 1,000,000, so long as $TDS_1<TDS_2$. Each of the foregoing numbers can be preceded by the word "about," "at least about," "less than about," or "more than about" and any of the foregoing numbers can be used singly to describe an open-ended range or in combination to describe a close-ended range. For example, the TDS content (ppm) of the brine composition is about 100,000 or more, about 200,000 to about 400,000, about 320,000 or less, or at least about 300,000. A higher or lower TDS content (ppm) of the brine composition is contemplated.

In some embodiments, the TDS content (g/L) of the brine composition is 240, 250, 260, 270, 280, 290, 300, 310, 320, 330, 340, 350, 360, 370, 380, 390, or 400, excluding the presence of any surfactants. Each of the foregoing numbers can be preceded by the word "about," "at least about," "less than about," or "more than about," and any of the foregoing numbers can be used singly to describe an open-ended range or in combination to describe a close-ended range. For example, the TDS content (g/L) of the brine composition can be about 260 or more, about 310 to about 330, at least about 290, or about 320. A higher or lower TDS content (g/L) of the brine composition is contemplated.

In some embodiments, the brine composition is a low salinity brine composition comprising any suitable total dissolved solids (TDS) content, excluding the presence of any surfactants. The TDS content (ppm) of the low salinity brine composition can be from about 100 ppm to about 10,000 ppm. In at least one embodiment, the TDS content of the low salinity brine composition ranges from $TDS_3$ to $TDS_4$, where each of $TDS_3$ to $TDS_4$ (in ppm) is 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 9900, or 10,000, so long as $TDS_3 < TDS_4$. Each of the foregoing numbers can be preceded by the word "about," "at least about," "less than about," or "more than about" and any of the foregoing numbers can be used singly to describe an open-ended range or in combination to describe a close-ended range. For example, the TDS content (ppm) of the low salinity brine composition is about 100 or more, about 200 to about 2,000, about 5,000 or less, or at least about 400. A higher or lower TDS content (ppm) of the low salinity brine composition is contemplated.

In some embodiments, the low salinity brine composition has a TDS content (g/L), excluding the presence of any surfactants, is 0.1, 0.2, 0.3, 0.4, 0.5, 0.6, 0.7, 0.8, 0.9, 1, 1.5, 2, 2.5, 3, 3.5, 4, 4.5, or 5, excluding the presence of any surfactants. Each of the foregoing numbers can be preceded by the word "about," "at least about," "less than about," or "more than about," and any of the foregoing numbers can be used singly to describe an open-ended range or in combination to describe a close-ended range. For example, the TDS content (g/L) of the low salinity brine composition can be 0.2 to about 0.5, about 1 or less, about 0.5 to about 5.

In some embodiments, the TDS content of the brine, excluding the presence of any surfactants, is from about 50,000 ppm to about 1,000,000 ppm, such as from about 100,000 ppm to about 700,000 ppm, such as from about 200,000 ppm to about 500,000 ppm, such as from about 300,000 ppm to about 400,000 ppm. In some embodiments, the brine composition has a TDS content that is less than about 50,000 ppm, such as less than about 40,000 ppm, such as less than about 30,000 ppm, such as less than about 20,000 ppm, such as less than about 10,000 ppm, such as less than about 5,000 ppm, such as less than about 2,000 ppm, such as less than about 1,500 ppm, such as from about 50 ppm to about 1,500 ppm, such as from about 100 ppm to about 1,000 ppm, such as from about 200 ppm to about 900 ppm, such as from about 300 ppm to about 800 ppm, such as from about 400 ppm to about 700 ppm, such as from about 500 ppm to about 600 ppm. Other ranges are contemplated.

In some embodiments, the brine composition and/or the low salinity brine composition includes water, such as municipal water, sea water, or water from other sources.

Methods

Embodiments of the present disclosure also relate to methods of utilizing a surfactant or a surfactant formulation described herein. The surfactant or surfactant formulations can be used with methods for treating oil-containing porous media, methods for altering, changing, or reversing the wettability of oil-containing porous media, and methods for producing hydrocarbons (oil) from oil-containing porous media. Other methods of using a surfactant or a surfactant formulation described herein are contemplated. Embodiments of the methods described herein can enable, e.g., oil recovery from, enhanced oil recovery from, and/or wettability reversal, of oil-containing porous media in an improved manner relative to the state-of-the-art.

Each of these methods generally include introducing a surfactant or a surfactant formulation with an oil-containing porous media. Introducing the surfactant or the surfactant formulation with the oil-containing porous media includes contacting the oil-containing porous media with the surfactant or the surfactant formulation. In some embodiments, contacting includes bringing into contact a surfactant or a surfactant formulation and a surface of an oil-containing porous media. In some embodiments, contacting includes bringing into contact a surfactant or a surfactant formulation and the interior of pores of an oil-containing porous media. In some embodiments, contacting includes bringing into contact a surfactant or a surfactant formulation and materials adsorbed onto a surface of an oil-containing porous media. In some embodiments, contacting includes bringing into contact a surfactant or a surfactant formulation and materials adsorbed onto or absorbed within the interior of pores of an oil-containing porous media.

Introducing the surfactant or the surfactant formulation with the oil-containing porous media can be performed at ambient conditions or reservoir conditions. Temperatures can range from about 10° C. to about 250° C., such as from about 20° C. to about 200° C., such as from about 50° C. to about 150° C., such as from about 75° C. to about 125° C. Other temperatures are contemplated. Pressures can range from about 0 psi to about 15,000 psi, such as from about 15 psi to about 12000 psi, such as from about 300 psi to about 10,000 psi, such as from about 500 psi to about 8,000 psi, such as from about 1,000 psi to about 6,500 psi, such as about 6,000 psi.

Suitable methods and apparatus known in the art can be utilized for introducing the surfactant or surfactant formulation with the oil-containing porous media such as an additive injection system. If it is desired to recover oil during performance of the method, suitable apparatus and methods known in the art (e.g., oil extraction apparatus) can be utilized to recover, collect, extract, or otherwise remove oil from the oil-containing porous media.

Methods described herein can be performed on unconventional reservoirs and conventional reservoirs. The methods can be performed on various oil-containing formations and reservoirs. Such formations and reservoirs contain oil-containing porous media. The methods can be performed on formations, reservoirs, and oil-containing porous media such as those already subjected to recovery operations, such as primary, secondary, and/or tertiary recovery operations. The formations, reservoirs, and oil-containing porous media can also include those not yet subject to such recovery operations. In some embodiments, the oil-containing porous media includes hydrocarbons, such as crude oil. In some embodiments, the oil-containing porous media comprises an oil-wet porous media comprising crude oil.

In some embodiments, the oil-containing porous media can be any suitable oil-containing porous media. For example, the oil-containing porous media can include quartz, calcite ($CaCO_3$), feldspar, dolomite ($MgCO_3$), silica, illite, apatite, muscovite, rutile, gypsum, anhydrite, chamosite, clinochlore, zircon, biotite, pyrite, kaolinite, mica minerals, trace minerals, organic matter, or any combination thereof. In some examples, the oil-containing porous media includes tight porous media. In some examples, the oil-containing porous media comprises rock. In some embodiments, the oil-containing porous media comprises quartz, calcite, feldspar, and dolomite. In some examples, the oil-containing porous media comprises dolomite. In some examples, the oil-containing porous media comprises an oil-wet porous media, a mixed-wet porous media, or a weakly water-wet porous media. In some examples, the oil-containing porous media comprises an oil-wet porous media comprising quartz, calcite, feldspar, dolomite, illite, apatite, muscovite, rutile, gypsum, anhydrite, chamosite, clinochlore, zircon, biotite, pyrite, expansible clays, kaolinite, mica minerals, trace minerals, or any combination thereof.

Methods described herein can be performed on unconventional reservoirs and conventional reservoirs. To date, state-of-the art-methods for chemical flooding of unconventional reservoirs is limited, and when it has been utilized, the amount of oil produced from the reservoirs is inadequate. Embodiments of the methods described herein overcome these and other issues.

In some embodiments, methods described herein can be performed in a tight oil reservoir, in a conventional oil reservoir, in a hydraulically fractured tight oil reservoir, and/or on a tight porous media. The term “tight” when used herein in relation to oil, a reservoir, or oil recovery is a term of art and is used herein consistent with its art-recognized definition. For example, tight porous media is a term typically used in relation to unconventional reservoirs or low permeability porous media with an average permeability of less than about 50 millidarcy (mD), or in some embodiments less than about 2 mD or 1 mD.

In some embodiments, methods described herein are performed in a tight porous media, an oil-wet porous media, a weakly oil wet porous media, a weakly water-wet porous media, and/or a water-wet porous media. In some embodiments, porous media includes MNC carbonate outcrop rocks.

In some embodiments, the porous media has any suitable pore size. For example, in some embodiments, the pore size (nm) is 1, 2, 3, 4, 5, 6, 7, 8, 9, 10, 12, 14, 16, 18, 20, 25, 30, 35, 40, 45, 50, 60, 70, 80, 90, 100, 120, 140, 160, 180, 200, 250, 300, 350, 400, 450, 500, 550, 600, 650, 700, 750, 800, 850, 900, 950, or 1000. Each of the foregoing numbers can be preceded by the word “about,” “at least about,” “less than about,” or “more than about”, and any of the foregoing numbers can be used singly to describe an open-ended range or in combination to describe a close-ended range. For example, and in some embodiments, the pore size is about 1 nm to about 3 nm, about 400 nm to 750 nm, less than about 300 nm, or at least about 450 nm.

In some examples, methods described herein are performed in a hydraulically fractured tight oil reservoir. Here, and prior to introducing the surfactant or surfactant formulation to the oil-containing porous media, the method can include creating fractures in rock formations in a tight oil reservoir, and propping the fractures open by administering a proppant.

In some embodiments, the oil-containing porous media is characterized as being water-wet, strongly water-wet, weakly water-wet, mixed-wet, weakly oil-wet, strongly oil-wet, or oil-wet. Typically, oil recovery is improved when the oil-containing porous media is on the water-wet side of the spectrum. In some embodiments, after introducing the surfactant or surfactant formulation to the oil-containing porous media, a characteristic of the oil containing porous media can be altered, changed, and/or reversed from one or more of the aforementioned characteristics (e.g., oil-wet) to a different characteristic (e.g., water-wet). For example, the method can result in a wettability reversal (or change) of the oil-containing porous media from an oil-wet state to a water-wet state, or vice versa. In another example, the method can result in a wettability reversal (or change) of the oil-containing porous media from a weakly water-wet state to a water-wet state. In another example, the method can result in a wettability reversal (or change) of the oil-containing porous media from a non-water-wet state to a water-wet state. Other changes, alterations, or reversals of the wettability are contemplated.

The term “wettability reversal” refers to altering an object (e.g., porous media, rock, et cetera) that is more oil-wet (on a spectrum) to be more water-wet (on a spectrum) or altering an object that is more water-wet (on a spectrum) to be more oil-wet (on a spectrum). In this regard, an object (e.g., porous media) that is more oil-wet is more susceptible to be wetted by oils and other hydrophobic fluids and materials, and an object (e.g., porous media) that is more water-wet is more susceptible to be wetted by aqueous fluids, and vice versa. A mixed-wet object (e.g., porous media) has a susceptibility to be wetted somewhere in between an oil-wet object and a water-wet object. Similarly, weakly water-wet (WWW) and strongly water-wet (SWW) specify relative degrees of water- or oil-wetness on a spectrum. Such terms are art-recognized terms. The term “non-water-wet” refers to any porous media not preferentially wetted by water.

As described herein, the oil-wet characteristics of the oil-containing porous media has precluded efforts to recover oil utilizing state-of-the-art methods and compositions. That is recovery has been limited in oil-wet reservoirs and formations. Embodiments described herein overcome these and other issues. For example, and as described herein introducing surfactant(s) or surfactant formulation(s) with an oil-containing porous media (originally in an oil-wet mixed-wet state) can result in converting the oil-containing porous media to a water-wet state (e.g., a WWW state and/or a SWW state), thereby enhancing oil recovery from the oil-containing porous media.

The contact between the surfactant(s) or surfactant formulation(s) and the oil-containing porous can induce spontaneous imbibition and oil production. Without wishing to be bound by theory, it is thought that several mechanisms may contribute to such effects, including reduction of the interfacial tension (IFT) between the organic and the aqueous phases, and wettability reversal of the rock to more water-wet conditions. If desired, the surfactant(s) or surfactant formulation(s) described herein can be added to hydraulic fracturing fluids, or other fluids utilized for oil recovery, to reach the rock matrix by inducing spontaneous imbibition and thus enhancing oil production.

Embodiments of the present disclosure can be further understood by the following non-limiting examples. The following non-limiting examples are put forth so as to provide those of ordinary skill in the art with a complete disclosure and description of how to make and use embodiments of the present disclosure, and are not intended to limit the scope of embodiments of the present disclosure.

EXAMPLES

The examples illustrate, e.g., the effect of surfactant structure and the effect of surfactant(s) on oil recovery and wettability reversal in oil-containing tight porous media. The examples also demonstrate the impact of surfactant structures on fluid/rock interactions and the identification of surfactant compositions/formulations for wettability reversal in, e.g., weakly water-wet and/or oil-wet porous media under various conditions (e.g., ambient conditions, reservoir conditions) and various brine salinities. Other features are illustrated.

Figure 1B:
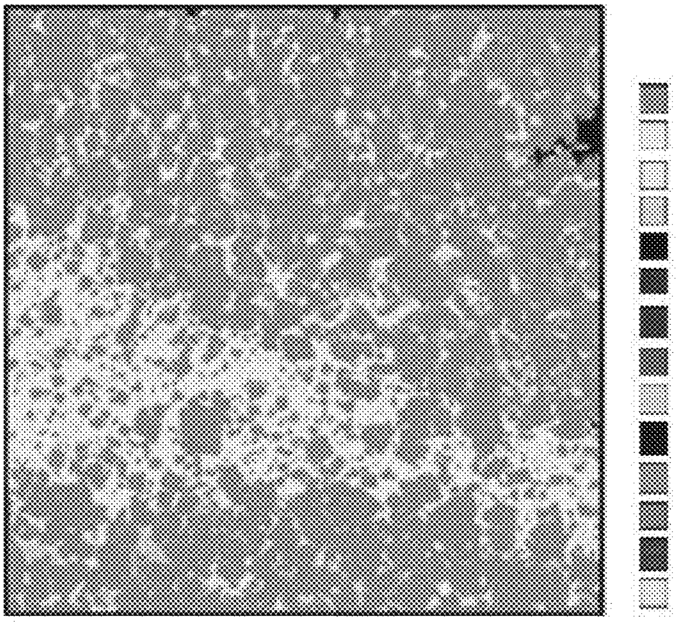
FIG. 1B is a quantitative evaluation of minerals by scanning electron microscopy (QEMSCAN™) mineralogy map of the MNC sample of FIG. 1A.

Rock samples: Minnesota Northern Cream (MNC) was selected as a representative carbonate outcrop sample for its homogeneity and similar mineralogy to a targeted reservoir rock. Dolomite constitutes about 70% of its minerals, and quartz occupies about 23% of its grains, as shown in FIGS. 1A and 1B. Table 1 shows several petro-physical properties of the MNC outcrop core samples utilized for the examples.

TABLE 1

| Rock Sample | Average porosity, % | Average permeability, mD | Average oil saturation, % |
|---|---|---|---|
| MNC carbonate | 14.3 | 2.09 | 90.25 |

Fluids: A reservoir crude oil was used for the examples. Entrapped moisture and solid matter was separated from the crude oil by centrifuging at about 6,000 rpm for about one hour at about 22° C. The crude oil was then filtered through an in-line filter with a pore size filter of about 0.5 μm. The density of the crude oil was measured to be about 0.7779 g/cm$^3$ using an in-line density meter at about 6,000 psi and about 120° C.

Two types of brine were used for the examples—a "reservoir brine" (also referred to as a "blank brine"); and a "low salinity brine." The reservoir brine, or blank brine, was utilized to prepare all surfactant solutions used for the data of the Examples.

The reservoir brine (also referred to as "blank brine") used in the examples had a total dissolved solids (TDS) of about 320,000 ppm and generally contained sodium chloride, magnesium chloride, and calcium chloride. The densities of blank brine and crude oil at example ambient conditions (about 14.7 psi and about 20° C.) and example reservoir conditions (about 6,000 psi and about 120° C.) are listed in Table 2. The densities of the blank brine at ambient and reservoir conditions were determined to be about 1.2101 g/cm$^3$ and about 1.1654 g/cm$^3$, respectively. The densities of the crude oil at ambient and reservoir conditions were determined to be about 0.8263 g/cm$^3$ and about 0.7779 g/cm$^3$, respectively.

TABLE 2

| | Crude oil | Blank brine |
|---|---|---|
| Density (g/cm$^3$) at 20° C. and 14.7 psi | 0.8263 | 1.2101 |
| Density (g/cm$^3$) at 120° C. and 6,000 psi | 0.7779 | 1.1654 |

The low salinity brine was also used in several parts of the examples. The low salinity brine had a salinity of about 500 ppm and generally contained magnesium chloride and calcium chloride. This low salinity brine was used as the representative of municipal water that is being used during hydraulic fracturing operations. The low salinity brine was prepared by dissolving the salts dissolved in distilled water (resistivity of about 0.208 MΩ·cm).

Table 3 shows eight cationic surfactants used in the examples. The surfactants were purchased and used without further purification.

TABLE 3

Example Cationic Surfactants

| Surfactant name | Code name | Structure |
|---|---|---|
| Trimethyloctylammonium chloride | TOAC | $CH_3(CH_2)_7N(CH_3)_3Cl$ |
| Dodecyltrimethylammonium chloride | DTAC | $CH_3(CH_2)_{11}N(CH_3)_3Cl$ |
| Cetyltrimethyl ammonium chloride | CTAC | $CH_3(CH_2)_{15}N(CH_3)_3Cl$ |
| Trimethyloctadecylammonium chloride | TSAC | $CH_3(CH_2)_{17}N(CH_3)_3Cl$ |
| Trimethyloctylammonium bromide | TOAB | $CH_3(CH_2)_7N(CH_3)_3Br$ |
| Dodecyltrimethylammonium bromide | DTAB | $CH_3(CH_2)_{11}N(CH_3)_3Br$ |
| Hexadecyltrimethylammonium bromide (also known as cetyltrimethylammonium bromide) | CTAB | $CH_3(CH_2)_{15}N(CH_3)_3Br$ |
| Trimethyloctadecylammonium bromide | TODAB | $CH_3(CH_2)_{17}N(CH_3)_3Br$ |

As shown, the cationic surfactants are quaternary ammonium compounds. The chemical formula of the first four cationic surfactants is $CH_3(CH_2)_nN(CH_3)_3Cl$, and the next four have a formula of $CH_3(CH_2)_nN(CH_3)_3Br$. For each one of these cationic surfactants, the number of $CH_2$ groups in the alkyl group (n) has the following values: 7, 11, 15, and 17. The performance of the cationic surfactants was tested based on, e.g., both the counterion/hydrophilic head (chloride/bromide) and the length on the hydrophobic chain (n).

The cationic surfactants investigated have different numbers of methylene ($CH_2$) groups. The number of carbon atoms of the hydrophobic (alkyl) chain for TOAC, DTAC, CTAC, and TSAC is 8 carbon atoms (7 methylene carbons+1 methyl carbon), 12 carbon atoms (11 methylene carbons+1 methyl carbon), 16 carbon atoms (15 methylene carbons+1 methyl carbon), and 18 carbon atoms (17 methylene carbons+1 methyl carbon), respectively. Likewise, the number of carbon atoms of the hydrophobic (alkyl) chain for TOAB, DTAB, CTAB, and TODAB is 8 carbon atoms (7 methylene carbons+1 methyl carbon), 12 carbon atoms (11 methylene carbons+1 methyl carbon), 16 carbon atoms (15 methylene carbons+1 methyl carbon), and 18 carbon atoms (17 methylene carbons+1 methyl carbon), respectively.

Table 4 shows twenty nonionic surfactants—alcohol ethoxylates—used in the examples. In Table 4, n is the number of ethylene oxide (EO) units. One aim of choosing different surfactant families was to investigate the effect of hydrophilic chain length (number of ethylene oxide (EO) units) and hydrophobic chain length on the performance (oil recovery and wettability reversal).

TABLE 4

Nonionic Surfactants

| Surfactant family | Trade name | Chemical structure |
|---|---|---|
| Tridecyl ethoxylated alcohols | Poly (ethylene glycol) tridecyl ether (n = 18) | $CH_3(CH_2)_{12}(CH_2CH_2O)_nOH$ n = 18 |
| | MAKON ® TD-n | $CH_3(CH_2)_{12}(CH_2CH_2O)_nOH$ n = 3, 6, 9, 12, 18, 30 |
| Poly(oxyethylene) alcohols | BIO-SOFT ® N1-n | $CH_3(CH_2)_{10}(CH_2CH_2O)_nOH$ n = 3, 5, 7, 9 |
| | BIO-SOFT ® N91-n | $CH_3(CH_2)_{8-10}(CH_2CH_2O)_nOH$ n = 2.5, 6, 8 |
| Secondary alcohol ethoxylates | TERGITOL ™ 15-S-n | $CH_3(CH_2)_{11-13}(CH_2CH_2O)_nOH$ n = 5, 9, 15, 20, 31, 41 |

Table 5 shows cationic-nonionic blends of different cationic and nonionic surfactants utilized in the examples. The blends were prepared at distinct mixing ratios.

TABLE 5

| Cationic-Nonionic Blends | |
|---|---|
| Blend | Ratio(s) (v/v) |
| DTAB-POE 18 | 50:50 |
| DTAC-POE 18 | 50:50 |
| TOAB-POE 18 | 50:50, 25:75, and 75:25 |
| TOAC-POE 18 | 50:50 |
| CTAB-TERGITOL 15-S-15 | 50:50 |
| TSAC-TERGITOL 15-S-15 | 50:50 |
| DTAC-TERGITOL 15-S-15 | 50:50 |
| TOAB-TERGITOL 15-S-15 | 50:50 |
| CTAB-BIO-SOFT N91-8 | 50:50 |
| TSAC-BIO-SOFT N91-8 | 50:50 |
| DTAC-BIO-SOFT N91-8 | 50:50 |
| TOAB-BIO-SOFT N91-8 | 50:50, 25:75, and 75:25 |
| CTAB-POE 18 | 50:50 |
| TSAC-POE 18 | 50:50, 25:75, and 75:25 |
| DTAC-POE 18 | 50:50 |
| TOAB-POE 18 | 50:50 |
| CTAB-MAKON TD-18 | 50:50 |
| TSAC-MAKON TD-18 | 50:50 |
| DTAC-MAKON TD-18 | 50:50 |
| TOAB-MAKON TD-18 | 50:50 |

Microemulsion phase behavior: The microemulsion phase behavior of surfactants with different structures was investigated with respect to temperature. The effect of surfactant hydrophobic chain length on phase behavior was examined at ambient temperature (about 22° C.) and at elevated temperature (about 80° C.). For these experiments, glass pipettes were filled with brine/crude oil at a ratio of about 1:1 or surfactant solution/crude oil at a ratio of about 1:1. The pipettes were then sealed with a torch and shaken at the speed of about 250 rpm for about 24 hours (h). The pipettes were then monitored for several days and images were recorded.

Density: The density of the two phases (oil and brine; or oil and surfactant solution) was measured at atmospheric pressure and 22° C. using a DMA45 density meter from Anton Paar. The density of the two phases was also measured at reservoir conditions (120° C., 6000 psi) using an in-line density meter (DMA HPM, Anton Paar).

Surface/Interfacial Tension and Contact Angle: Various methods were utilized to measure the surface tension and interfacial tension (IFT) of samples depending on, e.g., the conditions tested, the densities of the samples, and whether the IFT is very low. The methods included captive/rising bubble method, the pendant drop method, and the spinning drop method.

Captive/rising bubble method: The captive/rising bubble method was utilized to measure the dynamic IFT and contact angle at reservoir conditions. This method was performed as follows. The lighter phase was injected through a needle to form a bubble inside the heavier phase. The IFT between the two phases was calculated from the shape of the bubble using the Young-Laplace equation through Axisymmetric Drop Shape Analysis (ADSA). The state-of-the-art interfacial tension and contact angle (IFT/CA) apparatus adopted for the measurements is described and used by S. Saraji et al., *Wettability of Supercritical Carbon Dioxide/Water/Quartz Systems: Simultaneous Measurement of Contact Angle and Interfacial Tension at Reservoir Conditions*, Langmuir, 29 (2013) 6856-6866. This experimental setup can operate at elevated temperature (up to 200° C.) and pressure (up to 8000 psi). The setup included a Hastelloy measurement cell, a charge couple device (CCD) camera, a dual-cylinder 5000-series Hastelloy Quizix pump to maintain the pressure inside the measurement cell, a temperature control system, and a thermocouple to measure the temperature inside the cell. The experimental setup also included a data acquisition system with Leica LAS software to capture images of the bubble, and an IFT analysis program using ADSA algorithm to calculate the interfacial tension from the shape of the bubble. For IFT measurements at reservoir conditions, the measurement cell was filled with the brine phase (or surfactant solution depending on the sample tested) using a Quizix pump. Hereafter, the cell was pressurized to the desired pressure and the temperature was increased using heating jackets firmly wrapped around the measurement cell. When both the pressure and the temperature were stabilized, the oil was injected through a needle using the Quizix pump to form a droplet inside the cell. For contact angle measurement, a droplet was injected from the needle onto the solid substrate and monitored by capturing several images with time and analyzing them using ImageJ software.

Pendant drop method: The pendant drop method was mainly utilized when the density of the suspended phase is higher than that of the bulk phase. The same device as that used in the captive/rising bubble method is used for the pendant drop method. The method consists of a drop suspended from a needle to determine interfacial and surface tension of liquid/liquid and liquid/gas systems. The critical micelle concentration (CMC) of cationic surfactants was measured using surface tension measurements between the surfactant solutions and air at ambient conditions. Spontaneous imbibition rates, in some examples, do not necessarily increase with an increase in the surfactant concentration, especially above the CMC. Therefore, generally, the measurements were performed at a concentration above CMC (about 0.1 wt %), which is the one typically used in the field.

Spinning drop method: The spinning drop method was utilized to measure ultra-low IFT values. The instrumentation included a KRÜSS Spinning Drop Tensiometer was employed and the spinning drop method was performed as follows. A crude oil droplet was launched from a capillary plug into a capillary tube filled with the surfactant solution. While the glass capillary tube was rotating, the software-controlled instrument measured the IFT between oil and brine by analyzing the drop shape which depends on the balance between interfacial and centrifugal forces. At low rotational speeds, the IFT is the dominating force and the droplet is spherical in shape. In this case the software uses Young-Laplace equation to calculate IFT. When the angular velocity is high, the droplet is elongated (length is at least 4 times the diameter) and Vonnegut's equation is used to calculate the IFT.

Krafft and cloud point temperatures at ambient conditions: At ambient conditions, the Krafft point and cloud point temperatures were determined as follows. Fresh brine solutions containing about 0.1 wt % of surfactant solution were prepared and poured into 25 ml glass vials. The vials were capped and placed upright in a water bath and/or heater at an initial temperature of about 22° C. The temperature of the water bath was gradually increased by increments of about 5° C. from about 22° C. to about 90° C. and monitored with a thermometer. For each increment, it typically took at least 20 minutes for the brine to reach thermal equilibrium (temperature stabilization) with the water bath. The cloud and Krafft points were determined visually by recording the temperatures at which cloudiness was observed or disappeared. Images of the brine solutions were captured after each temperature stabilization.

Krafft and cloud point temperatures at reservoir conditions: At reservoir conditions, the Krafft point and cloud point temperatures were determined as follows. The captive/rising bubble apparatus described above was used to study the solubility of the surfactants at reservoir conditions. The Quizix pump, discussed above, was used to fill the cell with brine and pressurize it. Using the heating jackets wrapped around the cell, the temperature of the brine was gradually increased to a temperature of about 100-120° C. Pressure was set to 6,000 psi unless indicated otherwise. The image of the brine solution at every temperature was captured using a CCD camera during this process. To observe changes in the phase behavior of the solutions, the clarity of the solution was monitored by examining the visibility of an IFT needle inserted in the cell and inside the solution. Typically, the needle would be visible in a clear solution and blurry in a partially cloudy solution. In a completely cloudy solution, the needle typically would be undetectable in the captured images.

Spontaneous imbibition at high temperatures: For these tests, core samples were prepared and aged. After aging, the spontaneous imbibition tests were performed at elevated temperature. Preparation/aging of the core samples and the method for determining spontaneous imbibition was performed as follows.

Preparation of core samples: MNC carbonate core plugs were drilled and cut into sizes of about 2.4" (length) and about 1.5" (diameter). The residue from the surface of the core was removed and rinsed with tap water. The cores were then dried in an oven at about 110° C. for about three days. The weight and dimensions of the dry core samples were acquired. The porosity and permeability of the core samples were measured using an automated helium porosimeter and permeameter. The dried MNC cores were put in vacuum cells at room temperature for at least about 24 hours and about 5 days, respectively. Then, the core samples were vacuum-saturated with crude oil for a duration of about 24 to about 72 hours.

Aging of core samples: The oil saturated cores were placed in a Hastelloy pressure vessel and immersed in fresh crude oil. The pressure vessel was secured with a Hastelloy cap and placed inside an oven. The pressure of the vessel and the temperature of the oven were increased to about 100 psi and about 120° C., respectively. The aging period for the 100% oil saturated MNC core samples was four weeks, which generally resulted in weakly water-wet rocks.

To ensure stronger wettability alteration during aging and to test the surfactant solutions, a new aging method that consists of establishing about 20% blank brine saturation in MNC cores via spontaneous imbibition was adopted. These cores were used for the oil-wet MNC tests. After vacuuming and oil saturating the samples, the samples were weighted and placed on individual low accuracy glass Amott cells at ambient conditions. About 20-25% of brine was imbibed into each core before they were weighted again and placed into the aging cell, immersed with the reservoir crude oil, and aged for 5 weeks at the abovementioned conditions. This aging method produced oil-wet rocks. The aging procedures utilized are summarized in Table 6.

TABLE 6

| Aging Methods | Duration | Conditions |
|---|---|---|
| MNC Carbonate with 100% oil saturation | 4 weeks | 120° C. and 100 psi |
| MNC Carbonate with initial 20-25% brine saturation | 5 weeks | 120° C. and 100 psi |

Overall, different aging methodologies were tested to, e.g., establish the most efficient method for high oil-wettability in MNC outcrop carbonates. Wettability alteration to more oil-wet conditions was best, in some circumstances, when an initial brine saturation of about 20-25% was established before oil saturation and subsequent aging of the cores at reservoir conditions.

Spontaneous imbibition at reservoir temperature: All spontaneous imbibition tests were performed at elevated temperature. An in-house reservoir temperature spontaneous imbibition setup was built by the Piri Research Group at the University of Wyoming. Custom-designed ovens with glass doors were purchased from Sheldon Manufacturing Company. Cell holders were designed and built at the University of Wyoming to safely place 10 Amott cells inside each oven. Manifolds equipped with pressure relief valves were built to enable experiments in the glass cells with a pressure of about 30-45 psi. This pressure was applied to prevent evaporation of oil inside the cells at elevated temperatures. Each Amott cell was individually connected to a needle valve and a pressure relief valve through a 1/16 inch high-pressure a nd high-temperature flexible tubing to control the pressure of each cell. The experiments were performed at about 100° C. and about 45 psi, and two types of cells with different resolutions were built for these experiments. Low-resolution (0.1 $cm^3$ accuracy) were used for conventional outcrop samples. Higher resolution (e.g., 0.01 $cm^3$ accuracy) was used for unconventional outcrop samples.

To assess the effectiveness of the aging methods adopted for the examples, spontaneous imbibition at high temperature was performed using blank brine and MNC outcrop samples that were aged using different procedures. The first test was performed on a fully oil-saturated MNC core that did not undergo any aging, while the second test used the same rock but aged in oil for 5 weeks at about 120° C. and about 100 psi. The third type of aging included of establishing a brine saturation of about 20% before aging in oil under the abovementioned conditions for about 5 weeks.

Figure 2:
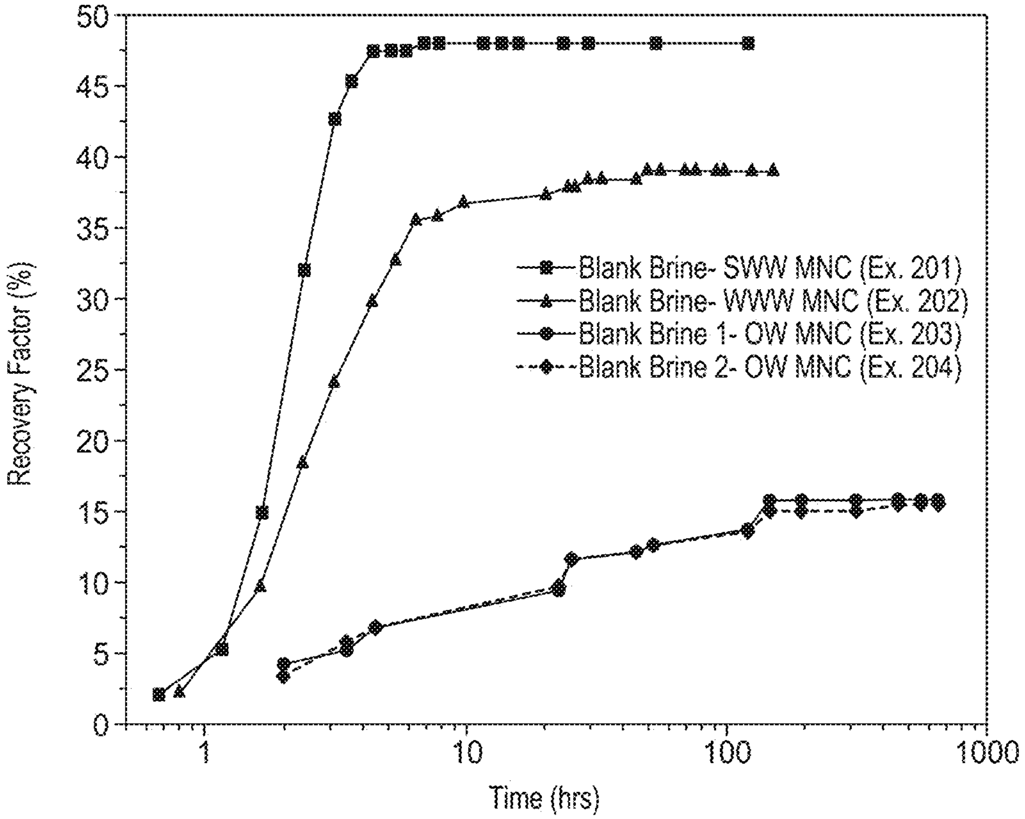
FIG. 2 is exemplary data showing oil recovery by spontaneous imbibition of blank brine into differently aged MNC outcrop samples according to at least one embodiment of the present disclosure.

FIG. 2 is exemplary data showing the recovery results for spontaneous imbibition, in terms of recovery factor (%) as a function of time, of blank brine into differently aged MNC outcrop samples. Example 201 and Example 202 represent the data for the spontaneous imbibition by brine in regularly aged MNC for weakly water-wet (WWW) conditions and strongly water-wet (SWW) conditions, respectively. Example 203 and Example 204 represent the data for oil-wet (OW) conditions as repeats of the same experiment. Spontaneous imbibition of brine in regularly aged MNC generally resulted in a recovery difference of about 9% between WWW conditions (Ex. 201) and SWW conditions (Ex. 202). Conversely, the aging with initial water saturation generally resulted in OW conditions and a recovery difference of about 24% from WWW cores and about 33% compared to SWW cores. Hence, and in the conditions tested, the latter aging was generally shown to be more effective in altering the rock's wettability to more oil wet conditions than regular aging (oil only). Moreover, the recovery from this type of aging was repeatable for the conditions tested.

The oil recovery by spontaneous imbibition in weakly water-wet (WWW) carbonate at high temperature was tested using various cationic surfactants, nonionic surfactants, and blends thereof. FIGS. 3A, 3B, 4A, 4B, 5A-5D, 6, and 7A-7C illustrate exemplary, but non-limiting, results. In FIGS. 4A, 4B, 5A-5D, 6, and 7A-7C, a solution comprising 0.1 wt % surfactant or 0.1 wt % surfactant blend was made using the blank brine.

Figure 3A:
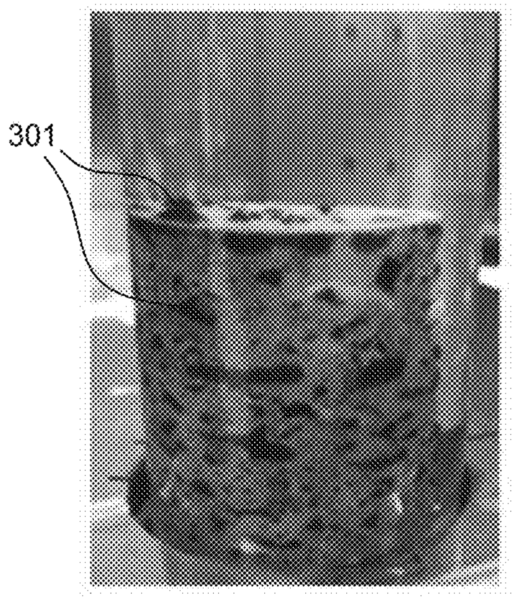
FIG. 3A is an exemplary image of oil recovery by spontaneous imbibition from weakly water-wet (WWW) MNC cores at high temperature using blank brine according to at least one embodiment of the present disclosure.
Figure 3B:
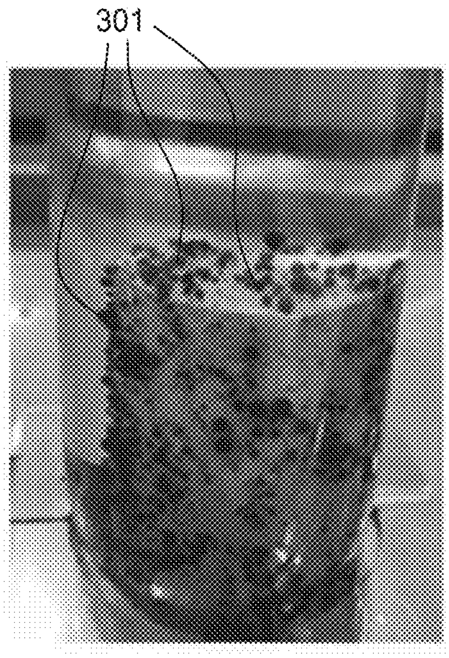
FIG. 3B is an exemplary image of oil recovery from WWW MNC cores at high temperature using trimethyloctylammonium chloride (TOAC) of about 0.1 wt % according to at least one embodiment of the present disclosure.

From the aging results, the regularly aged MNC outcrops were referred to as weakly water-wet carbonates. FIG. 3A shows the oil recovery from weakly water-wet (WWW) MNC cores at high temperature using blank brine. FIG. 3B shows the oil recovery from WWW MNC cores at high temperature using a TOAC solution (about 0.1 wt % TOAC in blank brine).

FIG. 3A indicated that some degree of wettability alteration occurs after the aging since the oil droplets 301 appeared to spread on the core and form large contact angles in the presence of blank brine. In contrast, and as shown in FIG. 3B, use of the wettability reversing surfactant TOAC generally resulted in non-spreading oil droplets 301 forming smaller contact angles. Furthermore, the oil was recovered from all sides of the cores which indicated counter-current spontaneous imbibition due to, e.g., the dominance of capillary forces over gravity, and indicated that wettability reversal occurred.

Figure 4A:
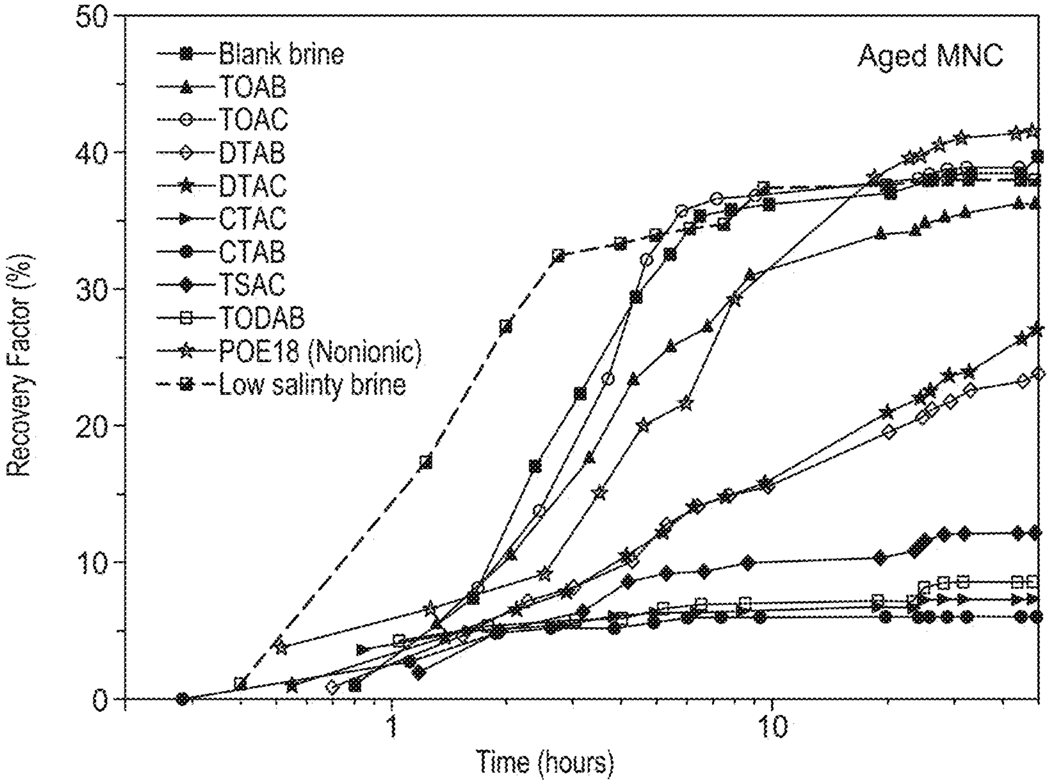
FIG. 4A shows exemplary data of oil recovery by spontaneous imbibition from WWW MNC core samples using various surfactants according to at least one embodiment of the present disclosure.
Figure 4B:
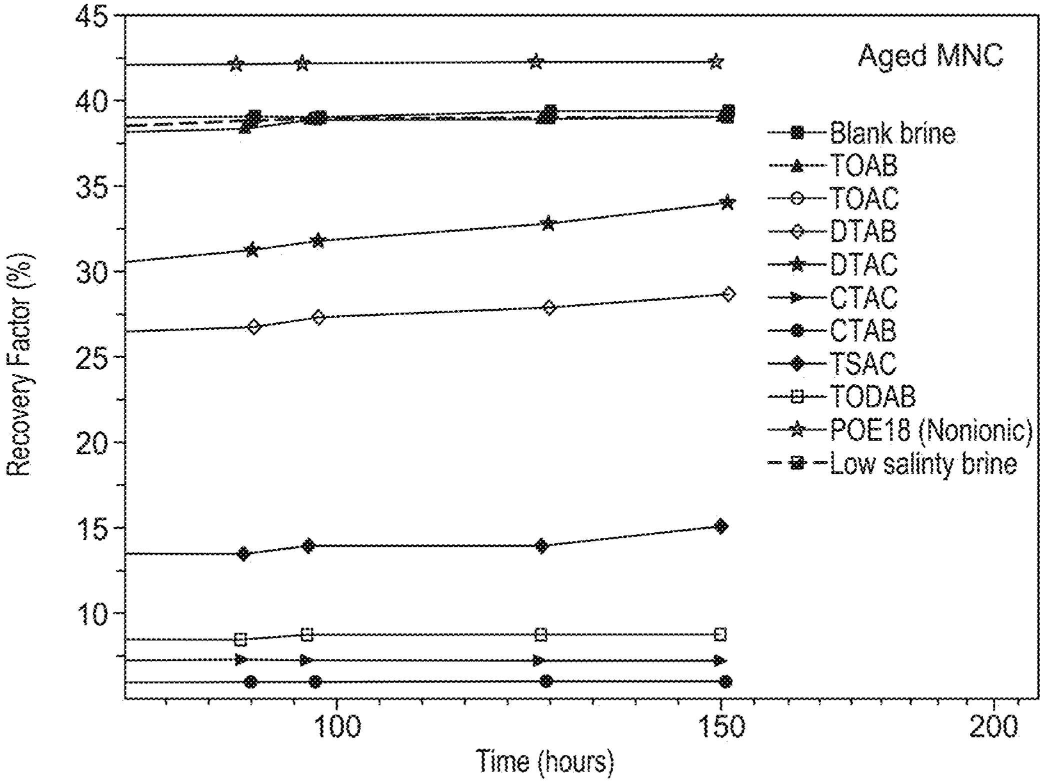
FIG. 4B shows exemplary data of ultimate recovery values (a close-up view of FIG. 4A) by spontaneous imbibition from WWW MNC core samples using various surfactants according to at least one embodiment of the present disclosure.

Several tests were conducted using the eight cationic surfactants—TOAB, TOAC, DTAB, DTAC, CTAC, CTAB, TSAC, and TODAB, and the nonionic surfactant POE 18, in addition to blank brine and low salinity brine. Owing to, e.g., its stability at high temperature, the low salinity brine resulted in the fastest oil recovery in some circumstances as shown in FIG. 4A. However, as illustrated in FIG. 4B, the final oil production was comparable to that of blank brine. This result may be due to a moderately lower IFT of the low salinity brine resulting in higher invasion of the pores and throats in the early stages of imbibition. Even though the nonionic POE 18 did not, in general, provide the fastest recovery rate, the final oil production was generally the highest using this surfactant under the conditions tested.

Among the cationic surfactants, TOAB and TOAC, with the shortest hydrophobic chains, generally resulted in the highest recoveries followed by DTAB and DTAC with slightly longer alkyl chains under the conditions tested (FIG. 4B). The eight cationic surfactants generally resulted in different ultimate oil recoveries ranging from a small value (about 6%) to large values (about 42%). These results were comparable with blank brine ultimate recovery because, e.g., wettability generally was not efficiently altered during aging. The same experiments were repeated with the oil-wet MNC core samples to effectively test the surfactants performance as described below.

Figure 5A:
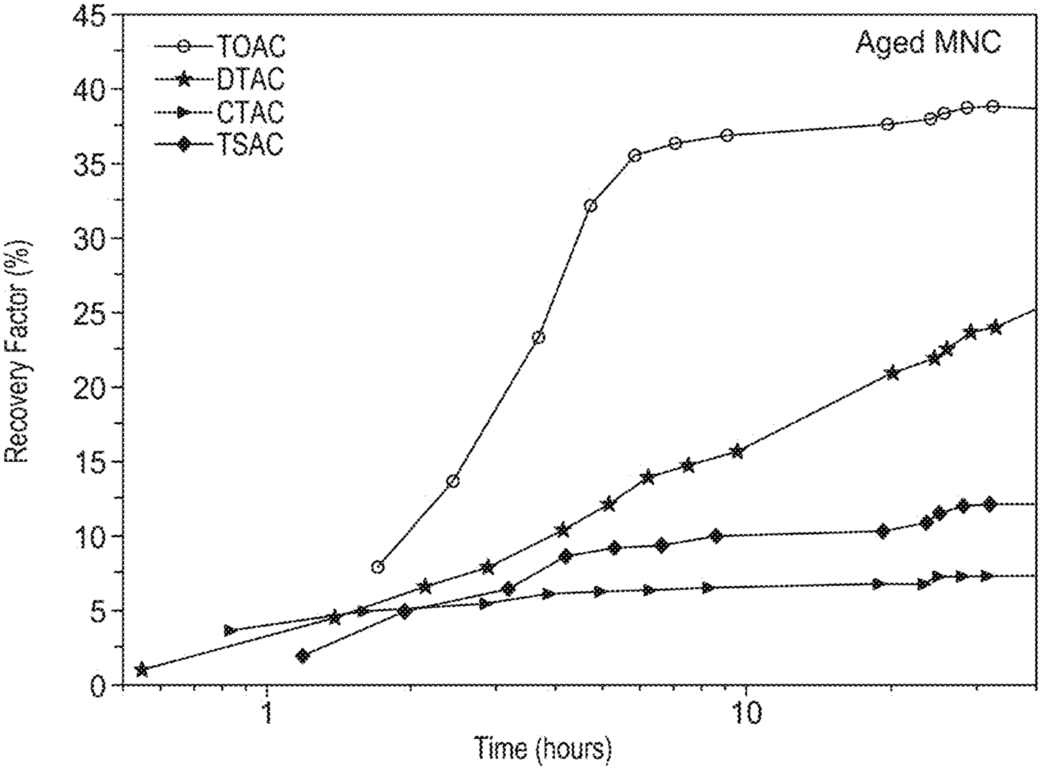
FIG. 5A shows exemplary data of oil recovery by spontaneous imbibition from WWW MNC core samples using surfactants having a chloride head according to at least one embodiment of the present disclosure.
Figure 5B:
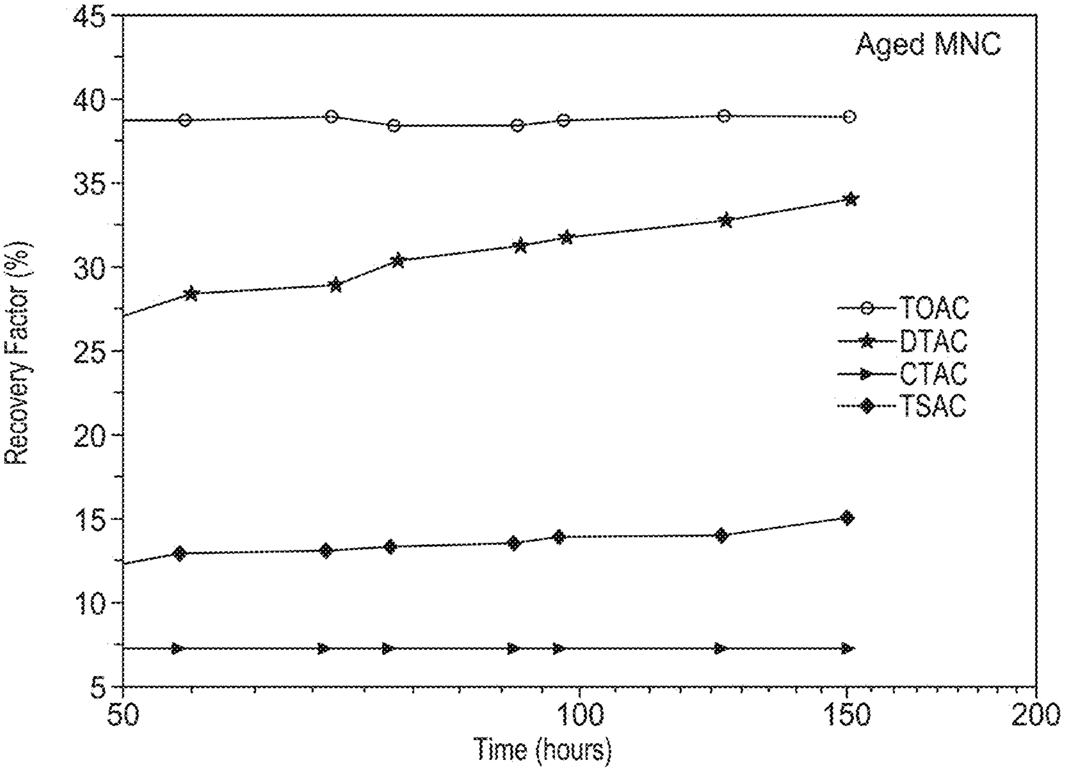
FIG. 5B is a close-up view of FIG. 5A illustrating ultimate recovery values from the WWW MNC core samples according to at least one embodiment of the present disclosure.
Figure 5C:
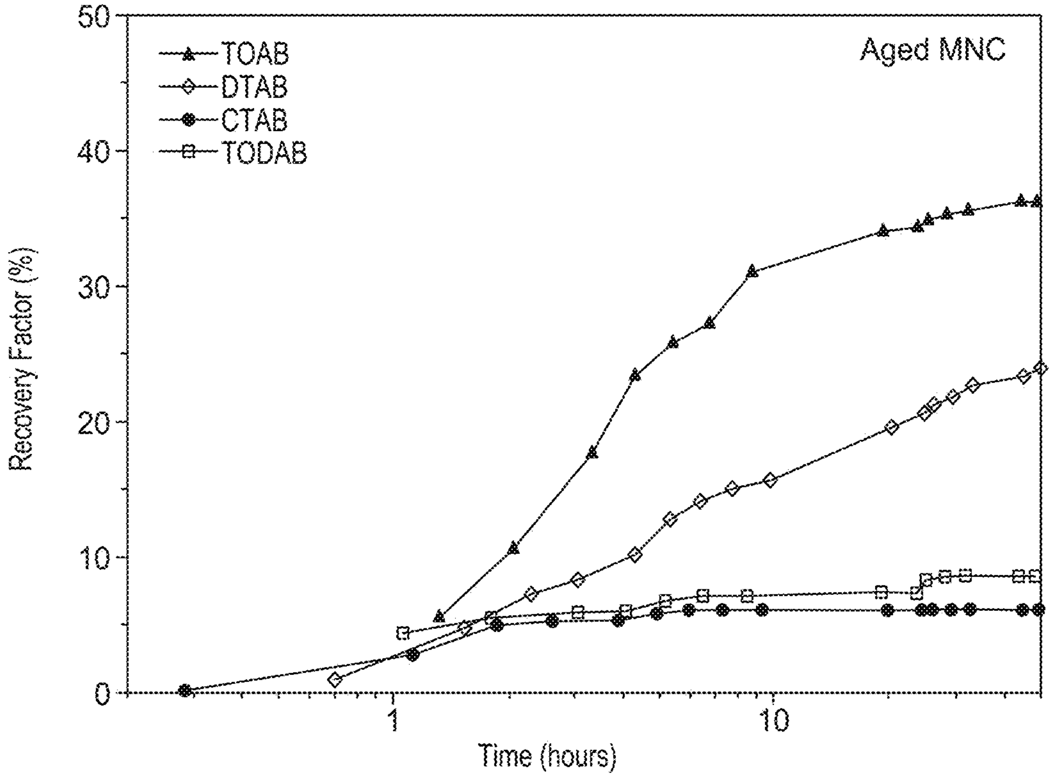
FIG. 5C shows exemplary data of oil recovery by spontaneous imbibition from WWW MNC core samples using surfactants having a bromide head according to at least one embodiment of the present disclosure.
Figure 5D:
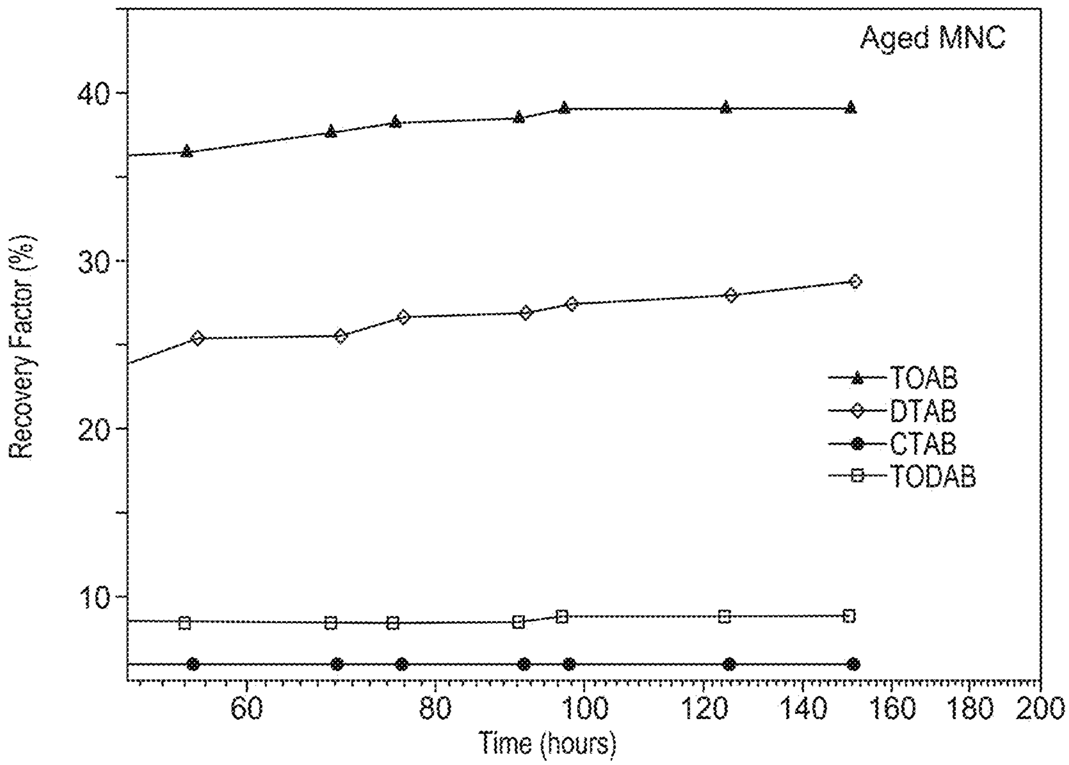
FIG. 5D is a close-up view of FIG. 5C illustrating ultimate recovery values from the WWW MNC core samples according to at least one embodiment of the present disclosure.

FIGS. 5A-5D show exemplary data for oil recoveries utilizing cationic surfactants having different counterions. Specifically, FIGS. 5A and 5B show data for oil recovery utilizing cationic surfactants with a chloride hydrophilic head, and FIGS. 5C and 5D show data for oil recovery utilizing cationic surfactants with a bromide hydrophilic head. TOAC and TOAB, with the shortest hydrophobic tails (8 carbon atoms, $CH_3(CH_2)_7$), resulted in the fastest and largest oil production under the conditions tested. Increasing the hydrophobicity of the surfactants decreased their efficiency in displacing oil in porous media.

The second most effective cationic surfactants under the conditions tested were those having a hydrophobic chain/tail of 12 carbon atoms ($CH_3(CH_2)_{11}$), DTAC and DTAB. CTAB and CTAC having a hydrophobic chain/tail of 16 carbon atoms ($CH_3(CH_2)_{15}$), generally led to the lowest oil production from the aged MNC samples. CTAB and CTAC were outperformed by those surfactants with the longest hydrophobic tail of 18 carbon atoms ($CH_3(CH_2)_{17}$), namely TSAC and TODAB. This result was attributed to the lowest IFT that these two surfactants realized. In addition, cationic surfactants with chloride heads generally performed better than the cationic surfactants with bromide heads.

Figure 6:
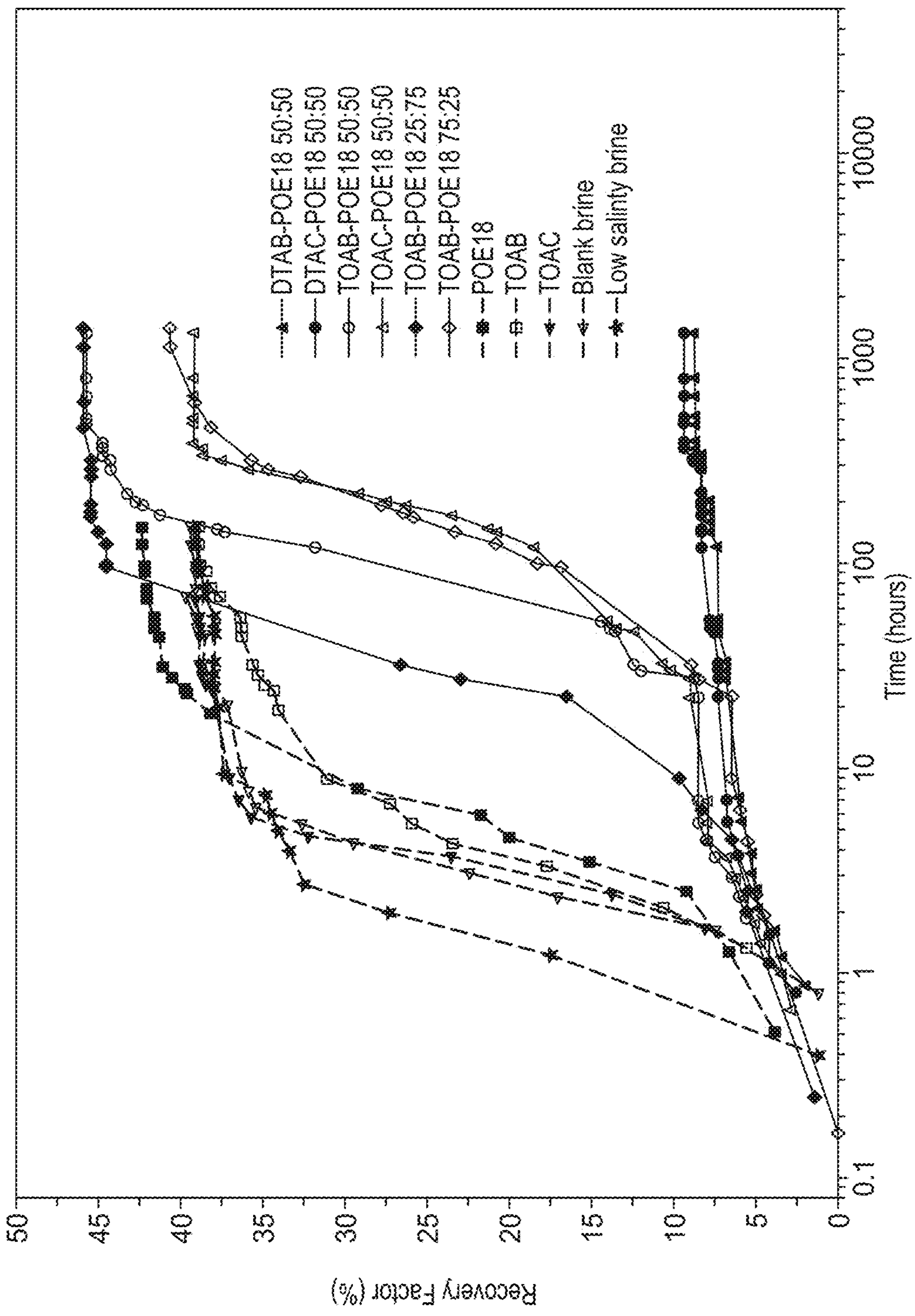
FIG. 6 shows exemplary data of oil recovery by spontaneous imbibition from WWW MNC core samples using surfactants or surfactant blends according to at least one embodiment of the present disclosure.

Blends of the nonionic surfactant POE 18 with one of the four cationic surfactants TOAC, TOAB, DTAC, and DTAB were tested. Each cationic surfactant was blended with the nonionic surfactant at a volume ratio of about 50:50 v/v. FIG. 6 shows the oil recoveries using the blends versus the pure surfactant solutions. The pure POE 18 solution generally had a higher recovery than TOAB and TOAC. Although pure TOAC and TOAB solutions generally produced similar ultimate recoveries, TOAC was more rapid in producing oil due to, e.g., its lower IFT compared to TOAB.

When blended with POE 18, TOAB generally outperformed TOAC. Among the four blends, TOAB-POE 18 (about 50:50 v/v) generally resulted in the fastest and the highest recovery. Different volume ratios of the TOAB-POE 18, specifically about 25:75 v/v and about 75:25 v/v, were also tested. The TOAB-POE 18 mixture having a volume ratio of about 75:25 v/v generally resulted in a lower and slower recovery than the TOAB-POE 18 mixture having a volume ratio of about 50:50 v/v. On the other hand, increasing the volume ratio of POE 18 (about 75%) to TOAB (about 25%) resulted in the quickest and the highest recovery among the formulations tested. IFT characterization of POE 18 showed that it is a good IFT reducer and the results of FIG. 6 indicate that TOAB generally is efficient for wettability reversal. Therefore, combining the effects of wettability alteration and IFT reduction at specific ratios can provide, e.g., beneficial recovery results.

Figure 7A:
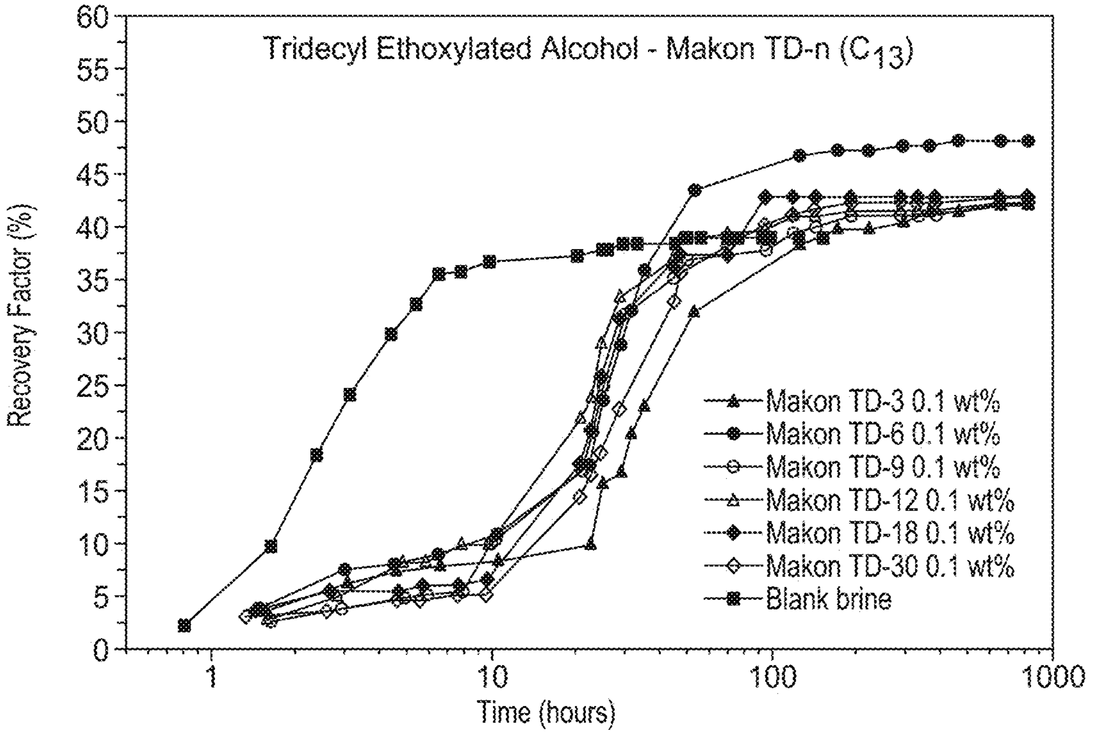
FIG. 7A shows exemplary data of the oil recovery by spontaneous imbibition from WWW MNC cores utilizing tridecyl ethoxylated alcohols, as example nonionic surfactants, according to at least one embodiment of the present disclosure.
Figure 7B:
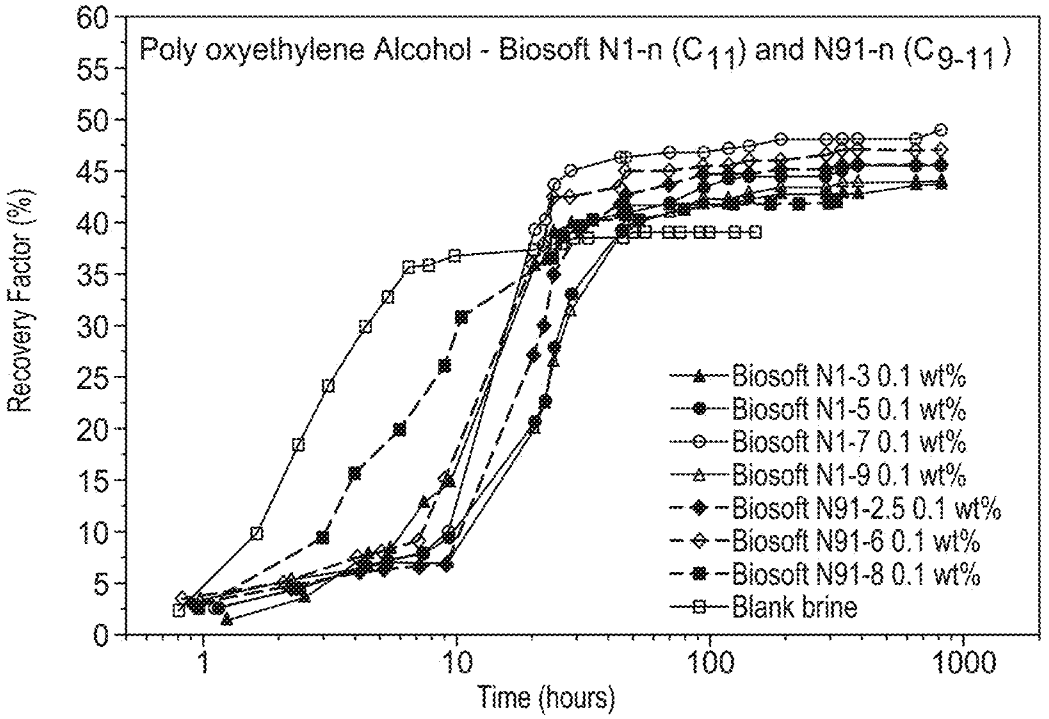
FIG. 7B shows exemplary data of the oil recovery by spontaneous imbibition from WWW MNC cores utilizing poly(oxyethylene) alcohols, as example nonionic surfactants, according to at least one embodiment of the present disclosure.
Figure 7C:
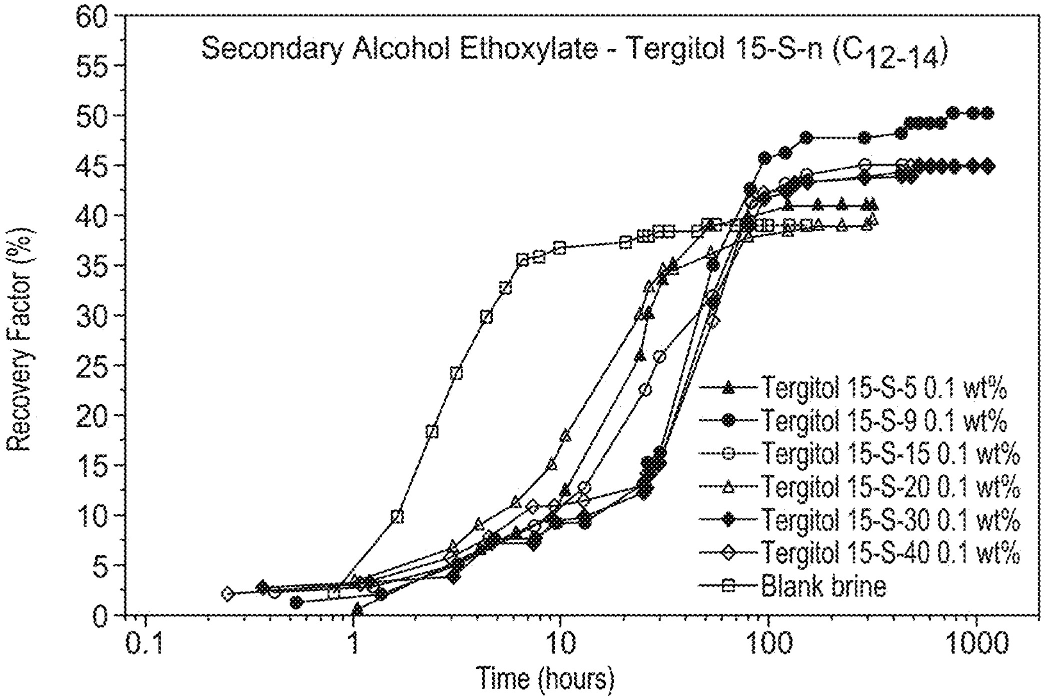
FIG. 7C shows exemplary data of the oil recovery by spontaneous imbibition from WWW MNC cores utilizing secondary alcohol ethoxylates, as example nonionic surfactants, according to at least one embodiment of the present disclosure.

Nonionic surfactant families were also tested with the WWW MNC outcrop samples to, e.g., investigate the effects of both hydrophilic (ethylene oxide (EO)) and hydrophobic (alkyl) chain lengths on oil recovery by spontaneous imbibition. FIGS. 7A-7C show exemplary data of the oil recoveries by spontaneous imbibition utilizing various example nonionic surfactants and brines. Specifically, FIG. 7A, FIG. 7B, and FIG. 7C show oil recovery using tridecyl ethoxylated alcohols (having a hydrophobic chain of 13 carbon atoms), poly(oxyethylene) alcohols (having a hydrophobic chain of 11 or 9-11 carbon atoms), and secondary alcohol ethoxylates (having a hydrophobic chain of 12-14 carbon atoms), respectively.

The first family is tridecyl ethoxylated alcohols, to which the previously used POE 18 belongs, with 13 carbon atoms in the alkyl chain. FIG. 7A indicated that increasing the hydrophilic chain length (or the number of EO groups) from about 3 to about 6 resulted in a faster oil recovery and an increase in oil recovery of about 6% to bring the ultimate recovery to about 48%. The data also indicated that a further increase in the hydrophilicity can have detrimental effects on the recovery starting at about 9 EO groups.

The second family—poly(oxyethylene) alcohols to which BIO-SOFT N1-n and BIO-SOFT N91-n belong—were investigated to correlate the length of surfactant hydrophobic (alkyl) chain to its recovery performance as well as to examine the effect of the hydrophilic EO groups on recovery. FIG. 7B shows exemplary data for the recoveries of example poly(oxyethylene) alcohols, BIO-SOFT N1 ($C_{11}$) type and BIO-SOFT N91 (mixture of $C_{9-11}$) type. For the BIO-SOFT N1 type, increasing the number of EO groups to about 7 increased oil recovery up to about 49%, while the recovery decreased when the number of EO groups is about 9. As for the BIO-SOFT N91 type, an increase in the degree of hydrophilicity generally increased the oil recovery up to a limit. Here, N91-8 (having 8 EO groups) generally provided the fastest but the lowest recovery.

Under the non-limiting conditions tested, BIO-SOFT N1-7 and BIO-SOFT N91-6 were found to be the best performing surfactant in each type of poly(oxyethylene)

alcohols. When comparing the best performing surfactant in each type, the data indicated that use of the surfactant with a single carbon chain length (BIO-SOFT N1-7) (having 11 carbon atoms in the alkyl group) resulted in a higher ultimate recovery than the surfactant with multiple carbon chain lengths (BIO-SOFT N91-6) (having 9-11 carbon atoms in the alkyl group). The third family tested was secondary alcohol ethoxylates, having a hydrophobic chain of 12-14 carbons and units of ethoxylation from about 5 to about 41, as shown in FIG. 7C. The spontaneous imbibition results indicated that increasing the hydrophilic chain length from about EO=5 to about EO=9 results in the highest ultimate recovery (about 50%).

Overall, and under the conditions tested, the nonionic surfactants generally outperformed brine in terms of the ultimate oil recovery. The late recovery compared to brine indicated that wettability reversal was generally favored. In addition, the effect on oil recovery of increasing the hydrophilic EO chain length is comparable among the three families. Also, under the non-limiting conditions tested, the best performing surfactants for each of the three families result in comparable ultimate recoveries, indicating that increasing the carbon number of the hydrophobic (alkyl) chain from about 11 to about 14 may not enhance the recovery further.

The oil recovery by spontaneous imbibition in oil-wet carbonate at high temperature was tested using various cationic surfactants, nonionic surfactants, and blends thereof. FIGS. 8A, 8B, 9A-9C, 10A, 10B, and 11 illustrate exemplary, but non-limiting, results. The surfactant solutions tested were formed using the blank brine. The amount in wt % of the surfactant within each surfactant solution is provided in these figures and/or the discussion thereof.

Figure 8A:
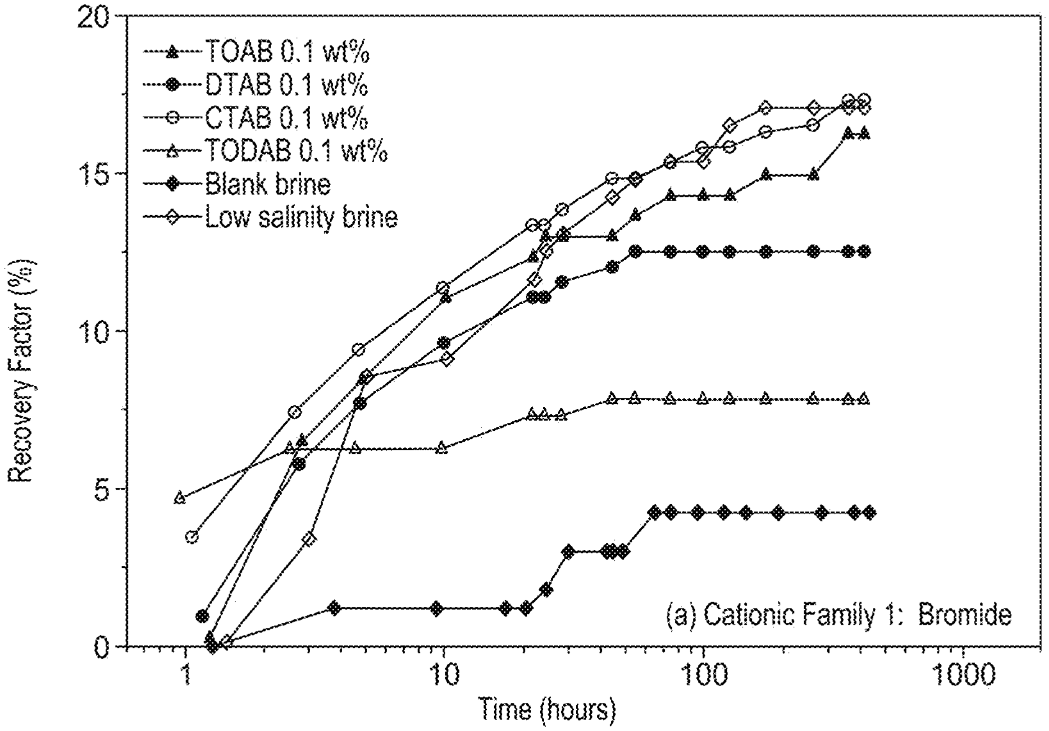
FIG. 8A shows exemplary data of the oil recovery by spontaneous imbibition from OW MNC cores utilizing example cationic surfactants having a bromide head according to at least one embodiment of the present disclosure.
Figure 8B:
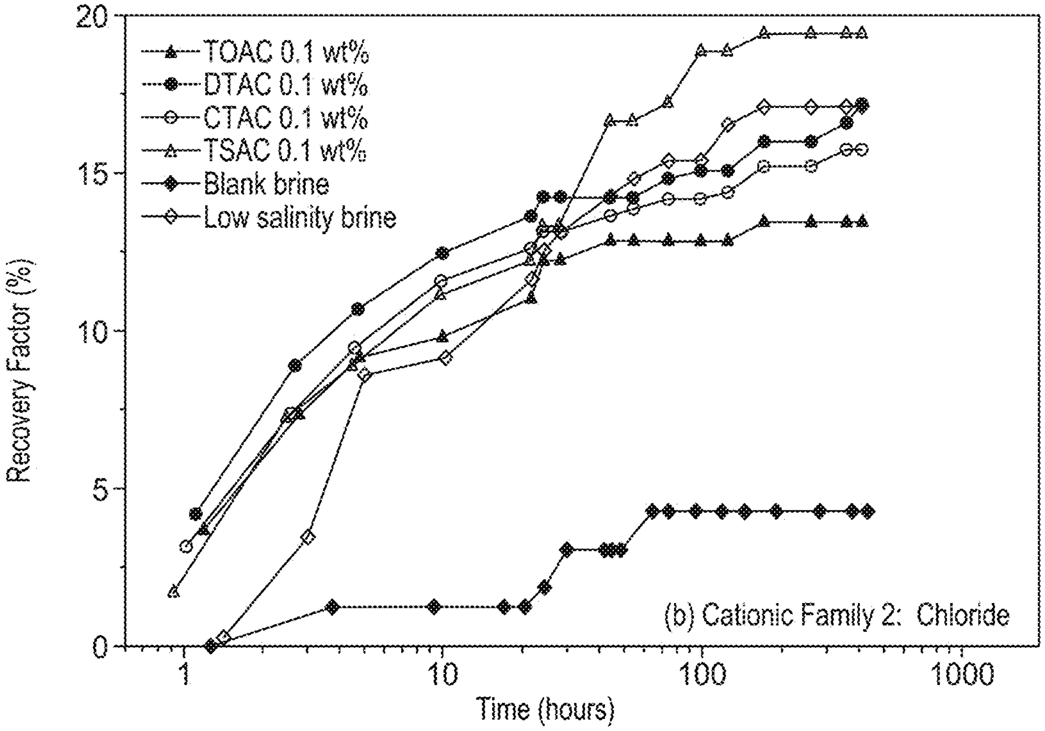
FIG. 8B shows exemplary data of the oil recovery by spontaneous imbibition from OW MNC cores utilizing example cationic surfactants having a chloride head according to at least one embodiment of the present disclosure.

FIGS. 8A and 8B show exemplary data of oil recovery by spontaneous imbibition from oil-wet (OW) MNC core samples using cationic surfactants having a bromide (cationic family 1), and cationic surfactants having a chloride (cationic family 2), respectively. The data indicated that recovery using surfactants outperformed brine, which shows the efficient wettability alteration of the cores toward oil-wet conditions after aging. This result is in contrast to the recovery from WWW MNC where brine was comparable to those of surfactants (described above). Use of the low salinity brine resulted in a high ultimate recovery but was generally not as effective at the early times.

With respect to the bromide-containing surfactants (FIG. 8A), increasing the number of carbon atoms in the alkyl group generally resulted in lower oil recovery. This result is indicated by the data for TOAB—having 8 carbon atoms in its alkyl group ($CH_3(CH_2)_7$)—and DTAB—having 12 carbon atoms ($CH_3(CH_2)_{11}$) in its alkyl group. The use of surfactant TODAB, with the longest alkyl group of 18 carbon atoms ($CH_3(CH_2)_{17}$) in its alkyl group, generally showed the lowest recovery among this family which is about 7.8%. The use of CTAB, with 16 carbon atoms (($CH_3(CH_2)_{15}$) in its alkyl group, resulted in the highest ultimate recovery of about 17.3%, versus about 4.2% for blank brine. Without wishing to be bound by theory, this result may be due to the high emulsifying property of CTAB such that both solubilized and free oil were observed from the low accuracy Amott imbibition cells.

With respect to the chloride-containing surfactants (FIG. 8B), increasing the carbon atom number of the alkyl group from about 8 to about 12 generally increased recovery. Nevertheless, the recovery generally decreased again when the alkyl group had 16 carbon atoms (CTAC, $CH_3(CH_2)_{15}$).

A quick imbibition was achieved using DTAC, having 12 carbon atoms (($CH_3(CH_2)_{11}$) in its alkyl group, even though it did not have the highest recovery. Surfactant TSAC, having the longest hydrophobic chain of 18 carbon atoms ($CH_3(CH_2)_{17}$) in its alkyl group was, in some circumstances, the best among the chloride family and all the cationic surfactants with a recovery of about 19.37%. TSAC was not only observed to have a good emulsifying property, but also resulted in the lowest IFT among the two cationic families (about 0.05 mN/m). Despite their lower recoveries, TOAB and DTAC were the most stable surfactants and generated the fastest recoveries.

Figure 9A:
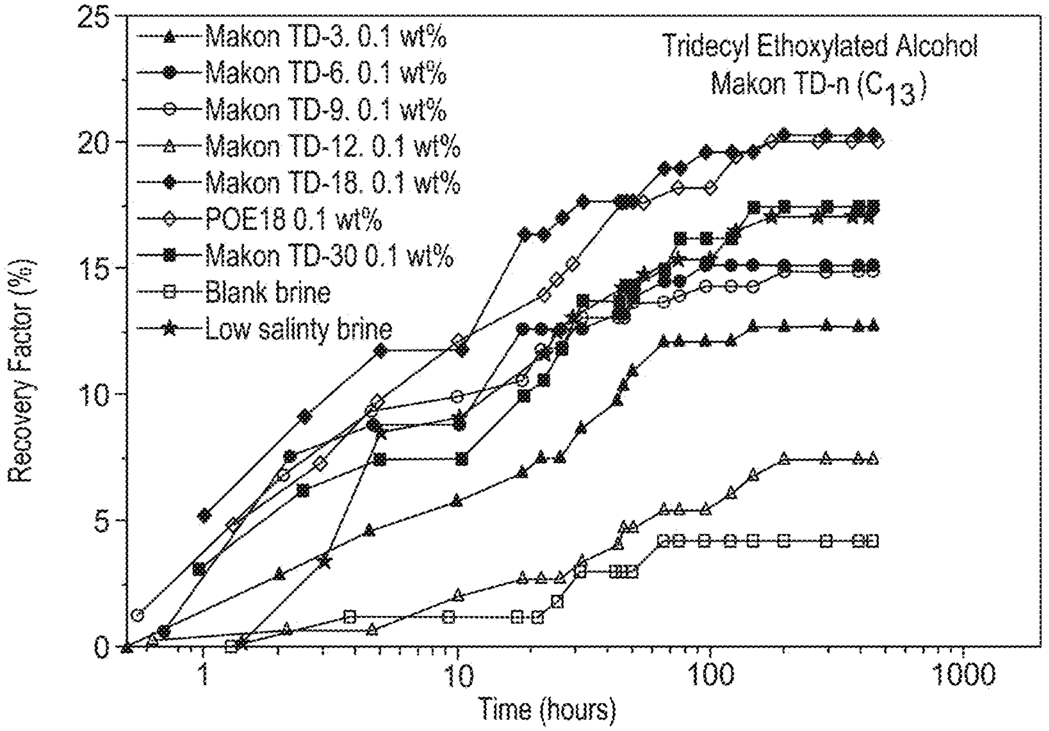
FIG. 9A shows exemplary data of the oil recovery by spontaneous imbibition from OW MNC cores utilizing tridecyl ethoxylated alcohols, as example nonionic surfactants, according to at least one embodiment of the present disclosure.
Figure 9B:
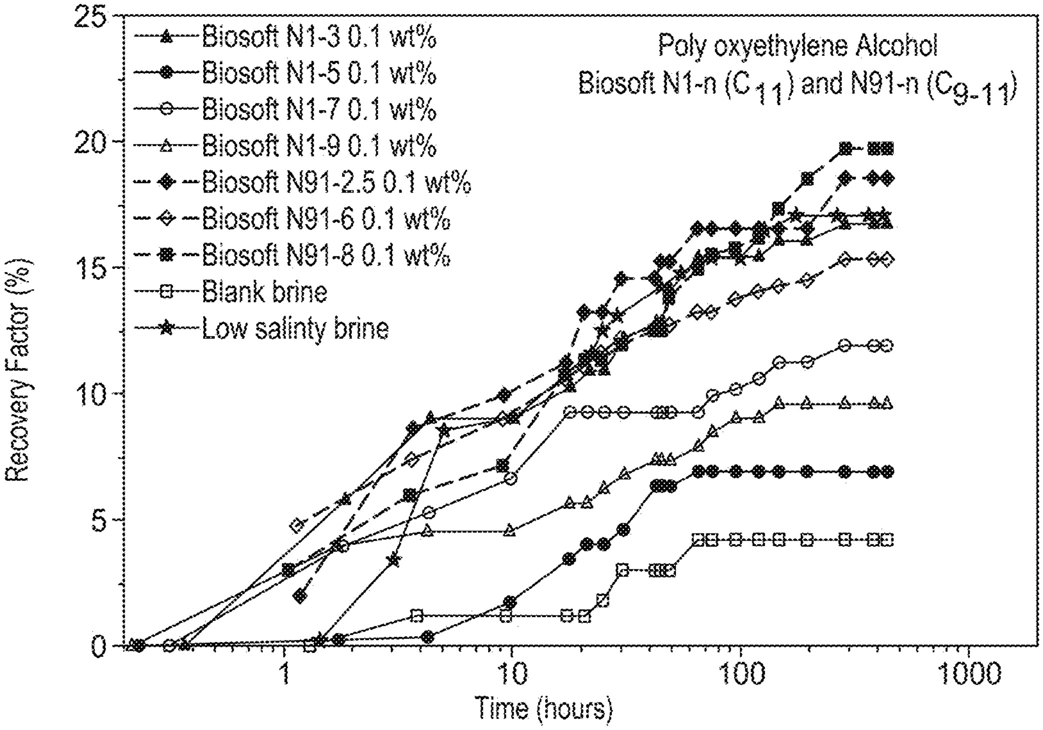
FIG. 9B shows exemplary data of the oil recovery by spontaneous imbibition from OW MNC cores utilizing poly(oxyethylene) alcohols, as example nonionic surfactants, according to at least one embodiment of the present disclosure.
Figure 9C:
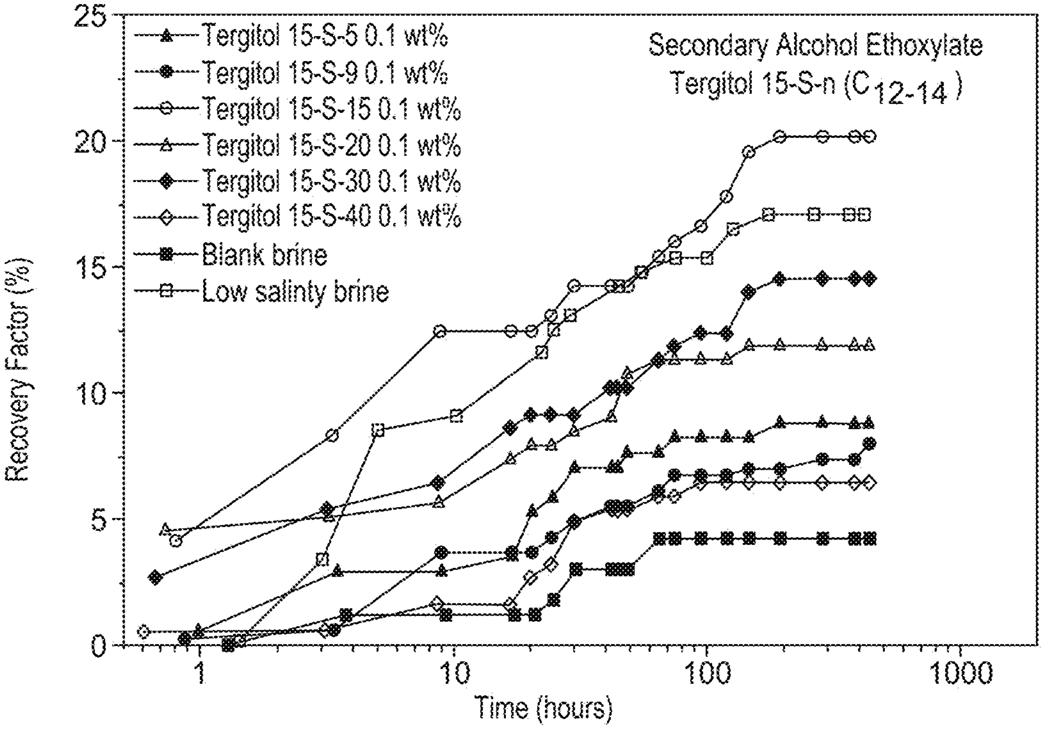
FIG. 9C shows exemplary data of the oil recovery by spontaneous imbibition from OW MNC cores utilizing secondary alcohol ethoxylates, as example nonionic surfactants, according to at least one embodiment of the present disclosure.

FIGS. 9A-9C show exemplary data for oil recovery by spontaneous imbibition from OW MNC core samples using various nonionic surfactants. Despite the fact that recovery from low salinity brine is as high as about 17%, the low salinity brine was outperformed by three tridecyl ethoxylated alcohol surfactants (FIG. 9A), two poly(oxyethylene) alcohol surfactants (FIG. 9B), and one secondary alcohol ethoxylate surfactant (FIG. 9C). The surfactants (in the wt % shown) were all prepared in the reservoir brine having 320,000 ppm salinity. The data indicated a significant advantage of using these surfactants in actual reservoir conditions, without resorting to the use of low salinity brine (500 ppm) which may be more expensive to inject in the field.

In the tridecyl ethoxylated alcohols family shown in FIG. 9A, Makon TD-18 with 18 EO groups in its hydrophilic chain gave both the highest (about 20.3%) and the fastest recovery. An increase in the hydrophilicity of the surfactant from about EO=3 to about EO=9 increased recovery and/or sped up the recovery up to a certain limit (about EO=12) beyond which the recovery decreased. A further increase of the number of EO groups to about EO=18 resulted in excellent recovery, which decreased again at about EO=30.

For the poly(oxyethylene) alcohols family shown in FIG. 9B, the surfactants with several carbon chain lengths from 9 to 11 (BIO-SOFT N91-n) (9 to 11 carbon atoms in the alkyl group) outperformed the ones with a single carbon chain length of about 11 (BIO-SOFT N1-n) in terms of both recovery amount and rate. Without wishing to be bound by theory, it is believed this result might be attributed to the effectiveness of branched surfactants in solubilizing and detaching oil from the porous medium. In the BIO-SOFT N91-n type, the surfactant with the lowest number of EO groups (about EO=2.5) generally resulted in the fastest recovery, while the one with the highest number of EO groups (about EO=8) generally gave the highest ultimate recovery. As for the BIO-SOFT N1-n type, the surfactant with the lowest number of EO groups (about EO=3) generally gave the highest and fastest recovery. A reduction in recovery was observed when increasing the number of EO groups.

Among the secondary ethoxylated alcohols shown in FIG. 9C, the surfactants with the shortest (Tergitol 15-S-5) and the longest (Tergitol 15-S-40, n=41) hydrophilic chain lengths gave the lowest recoveries. No clear structure-performance correlation was observed for this family. However, Tergitol 15-S-15 (which has an EO of about 15) resulted in the highest (about 20.13%) and the fastest recovery.

Under the non-limiting conditions tested, the best performing surfactant among the nonionic families generally was Makon TD-18, having 13 carbons in its alkyl group and 18 EO groups. Makon TD-18 has a high Hydrophilic-Lipophilic Balance (HLB) of 16 and a cloud point higher than about 100° C., which makes it not only stable at high temperature, but also tending to form Type I microemulsions where the surfactant micelles are dispersed in the aqueous phase. Moreover, Makon TD-18 generally shows very good performance at both high salinity and high temperature.

Figure 10A:
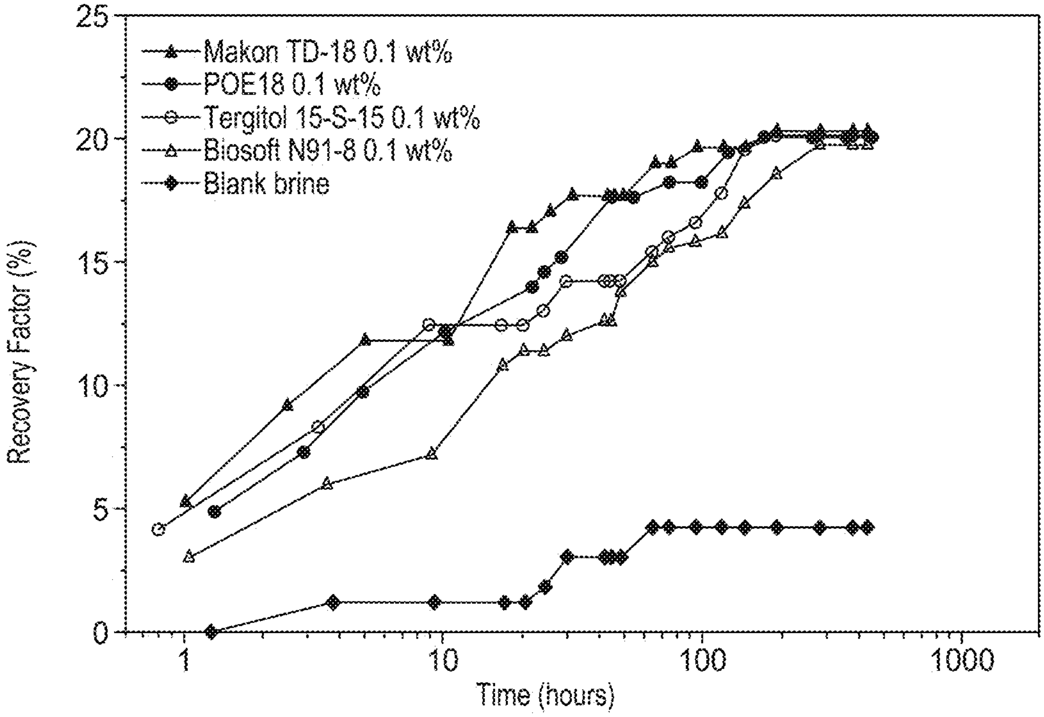
FIG. 10A shows exemplary data of the oil recovery by spontaneous imbibition from OW MNC cores using selected nonionic surfactants according to at least one embodiment of the present disclosure.
Figure 10B:
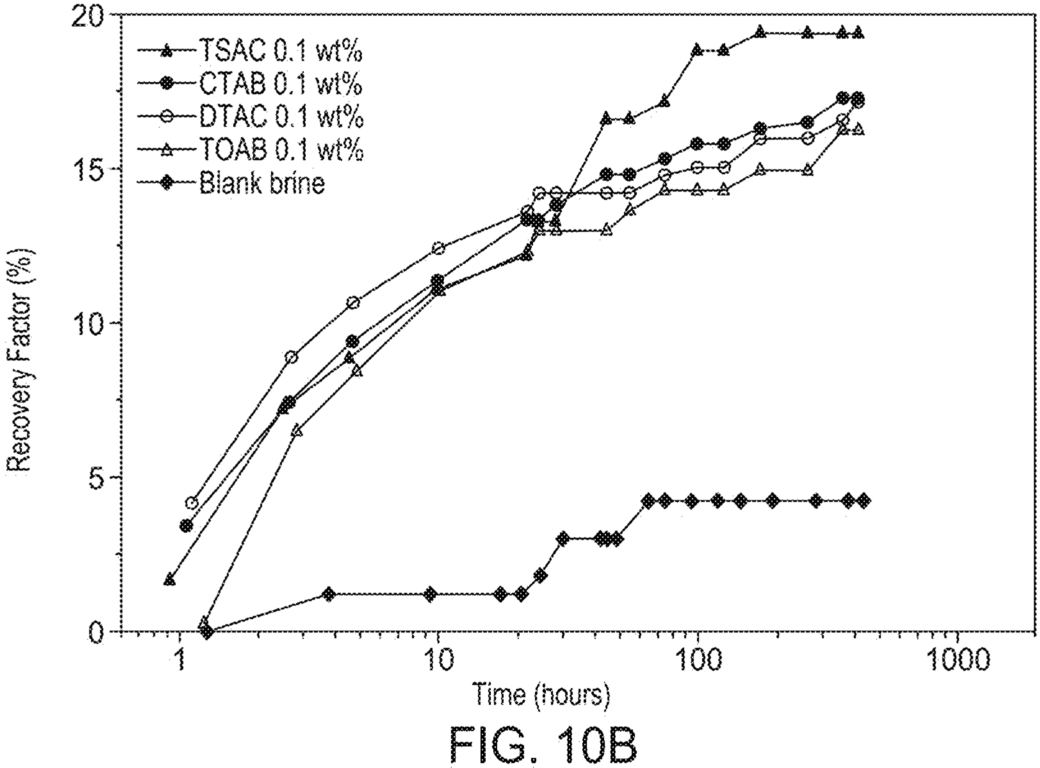
FIG. 10B shows exemplary data of the oil recovery by spontaneous imbibition from OW MNC cores using selected cationic surfactants according to at least one embodiment of the present disclosure.

FIGS. 10A and 10B show exemplary data for oil recovery by spontaneous imbibition from OW MNC core samples using various nonionic surfactants and cationic surfactants, respectively. For the nonionic families (FIG. 10A), four surfactants were chosen for blending. By comparing the ultimate recovery amounts and rates, single carbon chain number surfactants, such as $C_{13}$ ones (Makon TD-18 and POE 18), performed better than those containing a distribution of carbon atoms (e.g., $C_{12-14}$ and $C_{9-11}$). As for the cationic families (FIG. 10B), the first and second best in the chloride and bromide families under the conditions tested were determined to be TSAC and CTAB. The higher ultimate recovery may be due to due to the IFT reduction capability of TSAC and CTAB. The surfactants shown in FIGS. 10A and 10B were, in some circumstances, the best performing nonionic surfactants and cationic surfactants.

Figure 11:
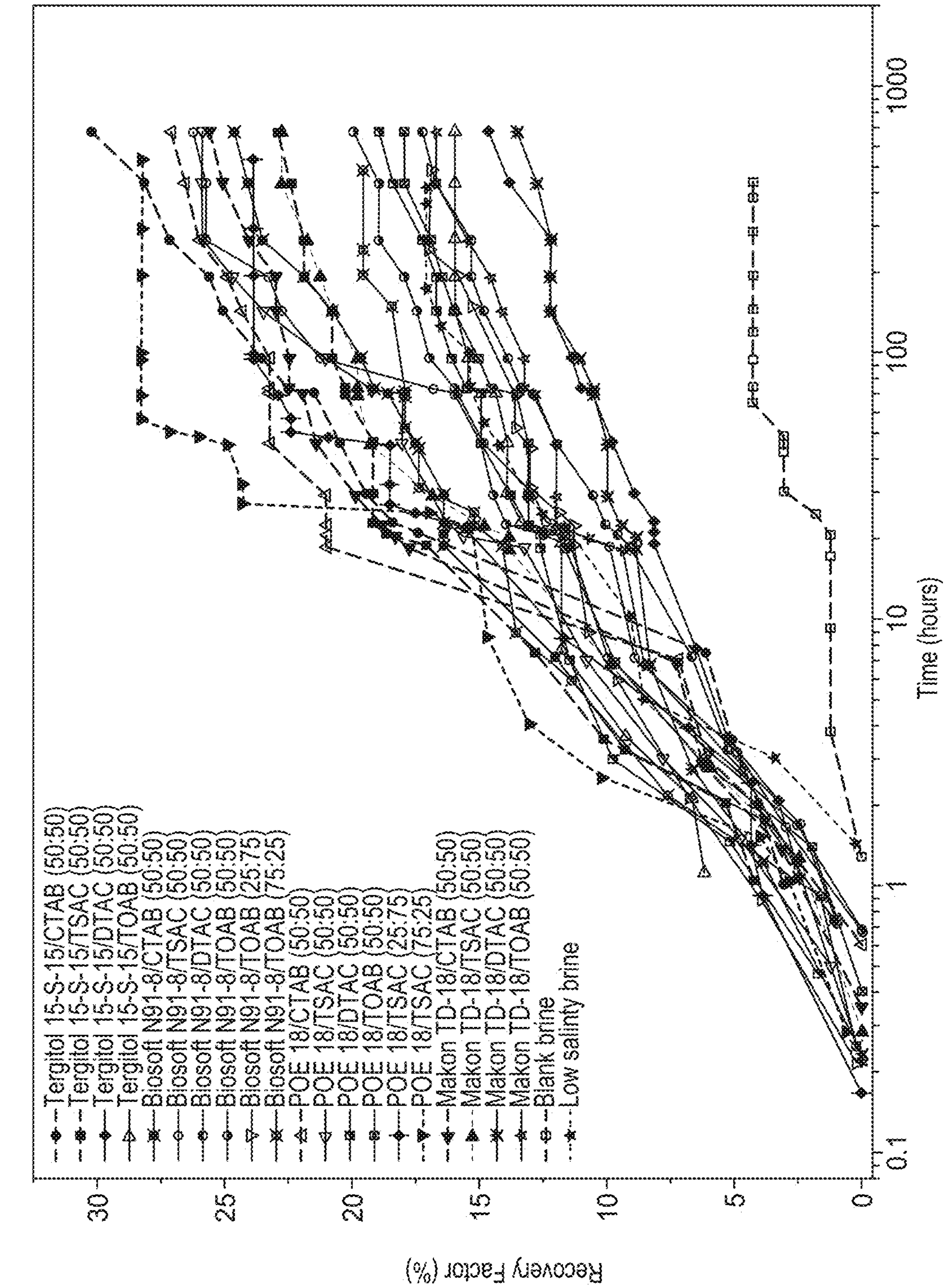
FIG. 11 shows exemplary data of the oil recovery by spontaneous imbibition from OW MNC cores using example surfactant blends according to at least one embodiment of the present disclosure.

As a result, and in some examples, blends of one or more of these nonionic surfactants and cationic surfactants were prepared. The four cationic surfactants and four nonionic surfactants were blended first at a ratio of about 50:50 resulting in a total of 16 blends. Subsequently, the 50:50 blend that performed better in some circumstances was blended at about 25:75 and about 75:25 ratios to investigate the effect of ratio of nonionic to cationic surfactants on recovery. Oil recovery by spontaneous imbibition from OW MNC core samples using such blends of nonionic surfactants and cationic surfactants are shown in FIG. 11. Surfactant solutions of each blend were made (about 0.1 wt % in the blank brine). Spontaneous imbibition was performed at about 100° C. and about 45 psi.

In FIG. 11, the dashed lines represent the mixtures that underwent emulsification during spontaneous imbibition (except for the blank brine and low salinity brine samples). Herein, two types of oil were observed—free oil and solubilized oil. Although DTAC generally outperformed TOAB as pure solutions of the surfactant, the opposite behavior was observed when DTAC or TOAB was blended with nonionic surfactants. Almost all of the mixtures that had either CTAB or TSAC demonstrated emulsification. This may be due to both the high emulsification ability and the low IFT that these two cationic surfactants. The highest ultimate recovery of about 30% in oil-wet samples was found with Tergitol 15-S-15:CTAB (about 50:50 v/v); however, around 1.75 ml out of 2.95 ml was solubilized oil. The data indicated that all mixtures/blends showed good potential in enhancing oil recovery. The following mixtures/blends showed excellent potential in enhancing oil recovery by a combination of wettability reversal and IFT reduction: Tergitol 15-S-15: CTAB (about 50:50 v/v), Tergitol 15-S-15:TSAC (about 50:50 v/v), POE 18:CTAB (about 50:50 v/v), POE 18:TSAC (about 75:25 v/v), Makon TD-18:CTAB (about 50:50 v/v), and Makon TD-18:TSAC (about 50:50 v/v).

Nevertheless, the IFT may be significantly reduced by these mixtures. When the IFT is reduced, emulsion separation may be performed after recovery. To test different ratios, two ~50:50 blends that did not show emulsification (BIO-SOFT N91-8:TOAB and POE 18:TSAC) were tested at about 75:25 v/v and about 25:75 v/v. At a ratio of about 50:50 v/v, POE 18:TSAC generally did not show any emulsification. However, at the other ratios, a very large amount of solubilized oil was observed and the spontaneous imbibition readings were unstable. The other mixture (BIO-SOFT N91-8:TOAB), in some circumstances, did not perform as well at ratios of about 75:25 v/v and about 25:75 v/v. In some circumstances, the best performing stable mixtures (e.g., little-to-no emulsification) are POE 18:TSAC and BIO-SOFT N91-8:TSAC at a ratio of about 50:50 v/v shown in FIG. 11. Overall the results indicated that pure wettability alteration can generally result in stable free oil only, but lower overall recovery. On the other hand, the combination of wettability alteration and IFT reduction can result in higher total recovery (free oil and solubilized oil), but the proportion of free oil is, in some circumstances, much lower.

The impact of surfactant structure on oil/brine interfacial properties was also examined investigating microemulsion phase behavior, surfactant aqueous solubility, dynamic surface/interfacial tension, and contact angle as described below.

Microemulsion phase behavior tests can generally be utilized to characterize surfactant stability. The phase behavior of surfactants can depend on distinct parameters such as temperature, surfactant concentration, and/or brine salinity. The effect of temperature on phase behavior was systematically investigated for various surfactants. Here, the phase behavior test was first performed on a pipette containing blank brine and the crude oil. Like ambient temperatures, increasing the temperature to about 80° C. did not impact the phase behavior and no sign of microemulsion was observed. This result may be attributed to the high IFT between reservoir crude oil and blank brine. As the temperature and pressure were increased towards reservoir conditions, the IFT generally increased as further described below.

Figure 12:
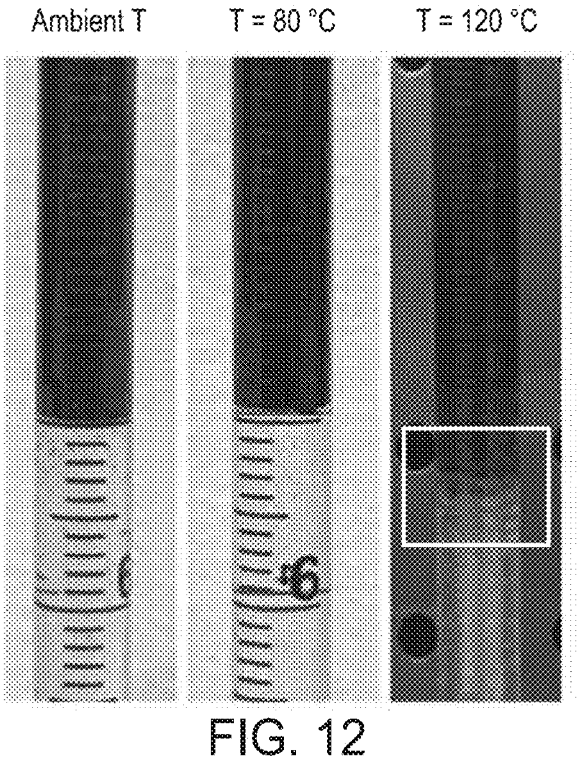
FIG. 12 is a series of exemplary images showing the phase behavior of the nonionic surfactant POE 18 at ambient and at elevated temperatures (80° C. and 120° C.) according to at least one embodiment of the present disclosure.

For surfactant solutions, on the contrary, increased temperatures generally affected the stability and solubility of the surfactant molecules, inverting the emulsion or causing it to break in some circumstances. An increase in temperature can boost the motion of the molecules due to elevated kinetic energy levels. Due to their relatively low cloud points, the stability of nonionic surfactants decreased by increasing temperature. During the spontaneous imbibition at 100 or 120° C., all the nonionic surfactants used were generally cloudy for the first few hours before becoming clearer again. FIG. 12 is a series of exemplary images showing the phase behavior of the nonionic surfactant POE 18 (about 0.1 wt % in blank brine) at ambient and high temperatures. The images indicated that increasing the temperature to about 80° C. curbed oil migration, which is possibly due to a decreasing stability of the nonionic POE 18 surfactant. At about 120° C., POE 18 became even more unstable and precipitated out of the brine solution as shown by the box.

Figure 13:
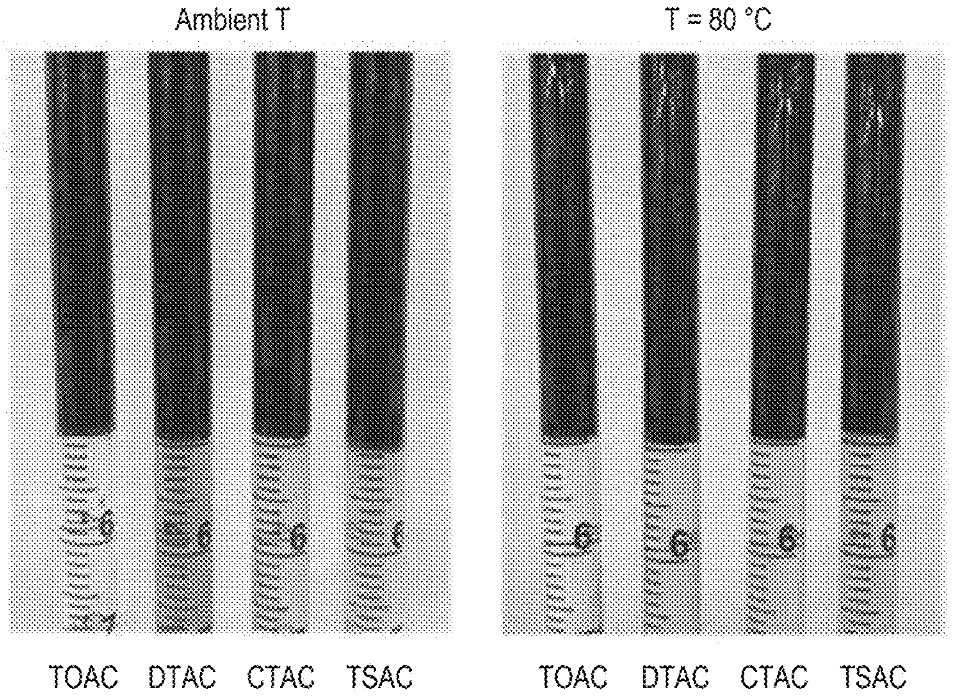
FIG. 13 is a series of exemplary images showing the phase behavior of cationic surfactants with a chloride head at ambient temperatures (left panel) and at 80° C. (right panel) according to at least one embodiment of the present disclosure.
Figure 14:
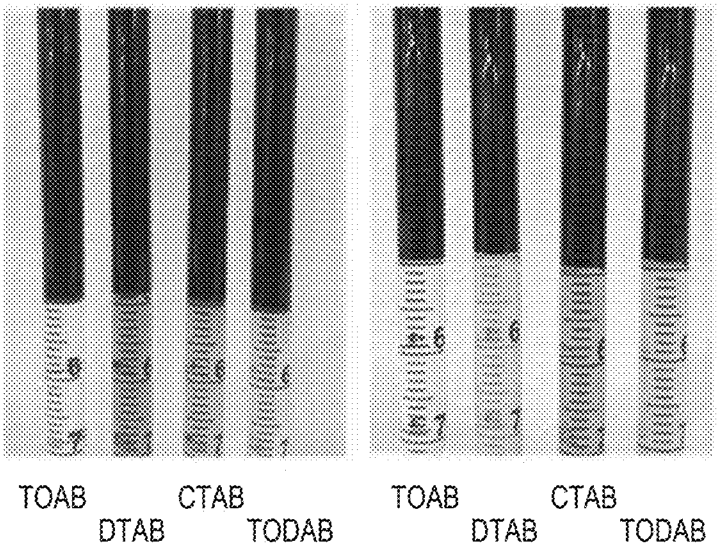
FIG. 14 is each a series of exemplary images showing the phase behavior of cationic surfactants with a bromide head at ambient temperatures (left panel) and at 80° C. (right panel) according to at least one embodiment of the present disclosure.

FIG. 13 is a series of exemplary images showing the phase behavior of cationic surfactants with a chloride head—TOAC, DTAC, CTAC, and TSAC—at ambient temperatures (left panel) and at about 80° C. (right panel). FIG. 14 is each a series of exemplary images showing the phase behavior of cationic surfactants with a bromide head—TOAB, DTAB, CTAB, and TODAB—at ambient temperatures (left panel) and at about 80° C. (right panel). For these tests, each surfactant was made into a surfactant solution (about 0.1 wt % in blank brine).

In both FIG. 13 and FIG. 14, the surfactant alkyl carbon atom number increases moving from left to right. The images indicated that both surfactant groups with chloride or bromide heads generally show a Winsor I type microemulsion (oil/water (o/w) microemulsion) at ambient temperatures. This Winsor I type microemulsion can be observed by a yellowish color of the brine phase due to migration of the oil molecules; for the images of FIGS. 13 and 14 the intensity of yellowish color is indicated by a grayer appearance of the brine phase. For example, the yellowish color in the brine phase (at ambient temperature) is observed readily for DTAC ($CH_3(CH_2)_{11}N(CH_3)_3Cl$) in FIG. 13 and DTAB ($CH_3(CH_2)_{11}N(CH_3)_3Br$) in FIG. 14. However, this effect is less pronounced when the temperature is increased to about 80° C. This observation may indicate that the stability of the emulsifying agents reduced slightly with temperature.

In both FIG. 13 and FIG. 14, the surfactants with the shortest hydrophobic heads, TOAC ($CH_3(CH_2)_7N(CH_3)_3Cl$) and TOAB ($CH_3(CH_2)_7N(CH_3)_3Br$), were less influenced by temperature. Starting from an alkyl carbon atom number of about 16 and for both ambient and high temperatures, surfactant dissolution in the aqueous phases generally decreased with increasing the carbon number. At the high temperature of about 80° C., the surfactants with the largest hydrophobic (alkyl) chain, TSAC ($CH_3(CH_2)_{17}N(CH_3)_3Cl$) and TODAB ($CH_3(CH_2)_{17}N(CH_3)_3Br$), had poor solubility such that the surfactants formed a phase (of about 0.1 $cm^3$) between the oil and brine.

Hydrophilic-lipophilic balance (HLB) numbers and cloud points of nonionic surfactants may help explain the phase behavior, stability, and the microemulsion type that each surfactant showed. Table 7 lists these parameters for the 3 families of nonionic surfactants. Increasing the number of ethoxylation moles (EO groups) in the hydrophilic chain increases their HLB. These surfactants are hydrophilic due to their high HLB (8-16) which makes them tend to solubilize in water and form o/w emulsions (Winsor Type I Microemulsion). Having surfactant micelles that are kept dispersed in the water phase is, in general, useful for wettability reversal studies to avoid Winsor Type III microemulsion, which could lead to recovery by IFT reduction.

TABLE 7

| Surfactant family | Surfactant name | HLB | Cloud point (° C.) |
|---|---|---|---|
| Tridecyl ethoxylated alcohols | Makon TD-3 | 8 | <25 |
| | Makon TD-6 | 11 | <25 |
| | Makon TD-9 | 13.1 | 57 |
| | Makon TD-12 | 14 | 89 |
| | Makon TD-18 | 16 | >100 |
| | Makon TD-30 | 17.4 | >100 |
| Poly(oxyethylene) alcohols | BIO-SOFT N1-3 | 8.7 | 8.5 (partially insoluble) |
| | BIO-SOFT N1-5 | 11.2 | 34 |
| | BIO-SOFT N1-7 | 12.9 | 58 |
| | BIO-SOFT N1-9 | 13.9 | 74 |
| | BIO-SOFT N91-2.5 | 8.5 | 2 (partially insoluble) |
| | BIO-SOFT N91-6 | 12.4 | 55 |
| | BIO-SOFT N91-8 | 13.9 | 79 |
| Secondary alcohol ethoxylates | Tergitol 15-S-5 | 10.5 | Dispersible |
| | Tergitol 15-S-9 | 13.3 | 60 |
| | Tergitol 15-S-15 | 15.4 | >100 |
| | Tergitol 15-S-20 | 16.3 | >100 |
| | Tergitol 15-S-30 | 17.4 | >100 |
| | Tergitol 15-S-40 | 18 | >100 |

Overall, the microemulsion phase behavior with cationic surfactants generally showed a Winsor Type I behavior. This effect can be mitigated by increasing temperature to about 80° C. Nonionic surfactants, however, precipitated at elevated temperatures. Due to, e.g., the high HLB of the nonionic surfactant families, the nonionic surfactants can be more prone to Winsor Type I microemulsion behavior, which in some circumstances can reduced their ability to significantly decrease IFT. These surfactants, in some circumstances, had greater potential of recovery by wettability alteration.

Figure 15:
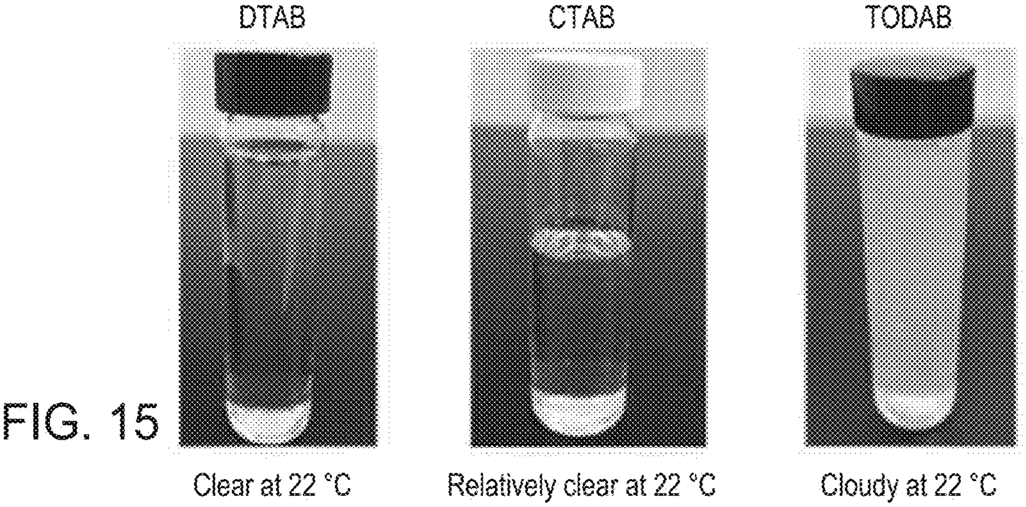
FIG. 15 is a series of exemplary images showing the solubility of cationic surfactants with a bromide head at ambient temperatures according to at least one embodiment of the present disclosure.

The effect of the hydrophobic (alkyl) chain length on the stability and aqueous solubility/cloudiness of cationic surfactants was examined by measuring Krafft points at elevated pressure and temperature were performed. FIG. 15 is a series of exemplary images of solutions of cationic surfactants having a bromide head with increasing carbon atom numbers from left to right—DTAB (left panel), CTAB (center panel), and TODAB (right panel). For these tests, each surfactant was made into a surfactant solution (about 0.1 wt % in blank brine). The images were captured at about 22° C. The results indicated that surfactant solubility/cloudiness can be reduced, at ambient conditions, by increasing the alkyl chain length from 12 to 18 carbon atoms.

Figure 16A:
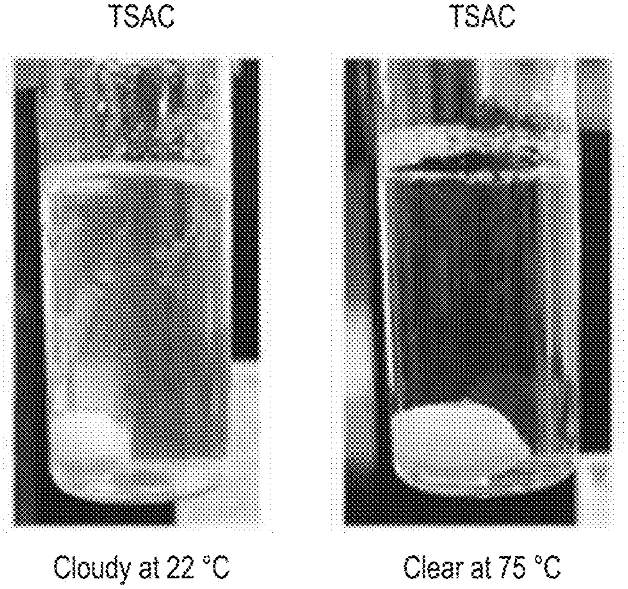
FIG. 16A shows exemplary images of a trimethyloctadecylammonium chloride (TSAC) solution at different temperatures according to at least one embodiment of the present disclosure.

A similar behavior was observed for chloride headed surfactants, with TOAC being the clearest (not shown) and TSAC being the cloudiest at about 22° C. FIG. 16A shows exemplary images of the TSAC surfactant solution (about 0.1 wt % in blank brine) at about 22° C. (left panel) and about 75° C. (right panel). When increasing the temperature of the TSAC surfactant solution while stirring, the solution started to become clear and stayed clear when the temperature reached about 75° C. Once left at ambient conditions, the solution started to become cloudy again.

Figure 16B:
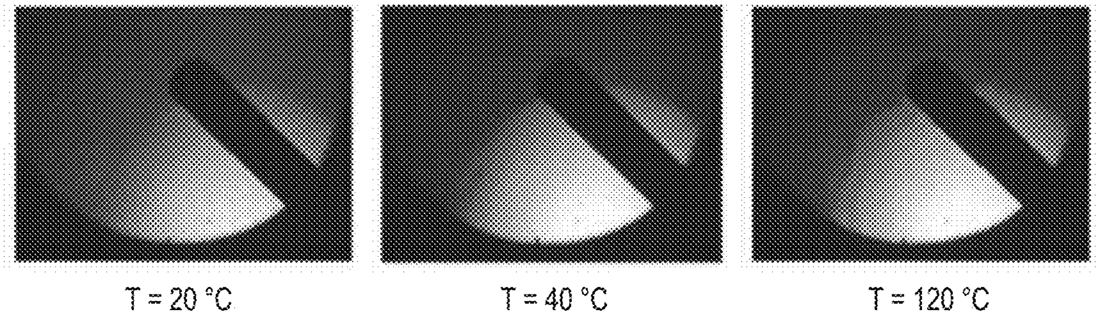
FIG. 16B is a series of exemplary images for the Krafft point measurement of a TSAC solution at elevated pressure and temperature according to at least one embodiment of the present disclosure.

In order to, e.g., observe the behavior of the TSAC surfactant solution at increased temperatures, the TSAC surfactant solution was monitored in the IFT cell by taking photographs of the solutions at various temperatures from about 20° C. to about 120° C., and a pressure of about 6,000 psi. FIG. 16B shows a series of exemplary images of the TSAC solution (about 0.1 wt % in blank brine) at these temperature intervals and at the exact temperature at which the cationic surfactant solution started to become clear (Krafft point), which is about 40° C. The TSAC solution used for FIG. 16B was placed at a pressure of about 6,000 psi. Although not shown, the cationic surfactants with shorter hydrophobic chains surfactants were also imaged at various temperatures from about 20° C. to about 120° C., and a pressure of about 6,000 psi. For these shorter hydrophobic chain surfactants, the images were clear in the IFT cell at about 20° C., and no major changes were observed while increasing the temperature.

Figure 17A:
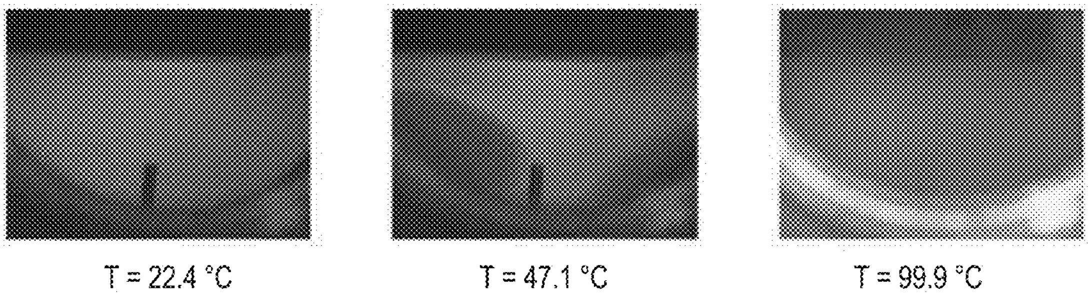
FIG. 17A is a series of exemplary images for the cloud point measurement of a POE 18 solution at elevated pressure and temperature according to at least one embodiment of the present disclosure.

The cloud points of certain nonionic surfactants were measured at high pressure (about 6,000 psi) and temperature. The nonionic surfactant POE 18 was targeted for this measurement since, in some circumstances, it gave the best results when blended with the cationic surfactants for the fully oil saturated MNC carbonates. FIG. 17A shows a series of exemplary images of a POE 18 solution (at a concentration of about 0.1 wt % in blank brine) at about 22.4° C. (left panel), about 47.1° C. (center panel) and about 99.9° C. (right panel), at a pressure of about 6,000 psi. The POE 18 solution started to become cloudy at a temperature of about 47.1° C., and thus about 47.1° C. was determined to be the cloud point. The cloud points of the three nonionic surfactant families are presented in Table 7. In each of the families, the higher the number of hydrophilic EO groups, the higher the cloud point is of the surfactant and the more soluble it is in the aqueous phase.

Figure 17B:
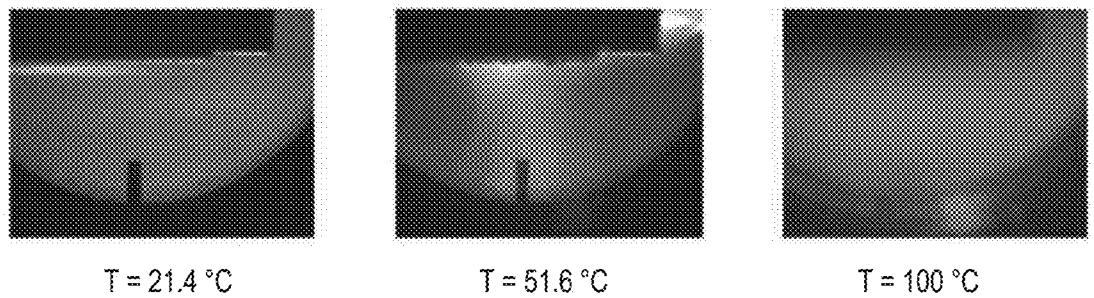
FIG. 17B is a series of exemplary images for the cloud point measurement of a POE 18:TOAB blend at elevated pressure and temperature according to at least one embodiment of the present disclosure (TOAB is trimethyloctylammonium bromide).

The effect of cationic surfactants on increasing the cloud point of the nonionic surfactant in various cationic-nonionic blends was investigated at elevated temperature and pressure to, e.g., gain a better insight on the stability of the blends. The Krafft point of the cationic short-alkyl-chain surfactant TOAB was very small and the solution was already clear at ambient conditions. FIG. 17B shows a series of exemplary images of a ~75:25 v/v POE 18:TOAB blend (at a concentration of about 0.1 wt % in blank brine) at about 21.4° C. (left panel), about 51.6° C. (center panel) and about 100° C. (right panel), at a pressure of about 6,000 psi.

The cloud point for the POE 18:TOAB blend was determined to be about 51.6° C. (FIG. 17B). It can be inferred that the cationic TOAB did not, in some instances, greatly improve the stability of the blend since it only increased the cloud point of the mixture by about 5° C. Without wishing to be bound by theory, this result might be attributed to the low percentage of the cationic TOAB in the mixture compared to the nonionic POE 18. Furthermore, and without wishing to be bound by theory, the cationic TOAB has only one group at its hydrophilic head and 8 carbon atoms on its hydrophobic tail. On the contrary, POE 18 has 18 units of hydrophilic ethylene oxide and 12 carbon atoms on the hydrophobic group which may make its behavior dominant in the solution.

Various experiments were performed to examine dynamic surface/interfacial tension of the surfactants. These experiments, further discussed below, included critical micelle concentration (CMC) measurements, IFT measurements of reservoir brine/crude oil under different conditions, measurements of IFT between surfactant solutions/reservoir oil under ambient conditions, and measurements of IFT between surfactant solutions/reservoir oil under reservoir conditions.

CMC measurements were performed to, e.g., investigate the effect of the hydrophobic chain length on the behavior of cationic surfactant molecules at the interface. The CMC is the concentration above which surface tension does not reduce any further. As a baseline, the surface tension of blank brine was measured to be about 75.4 mN/m.

Figure 18A:
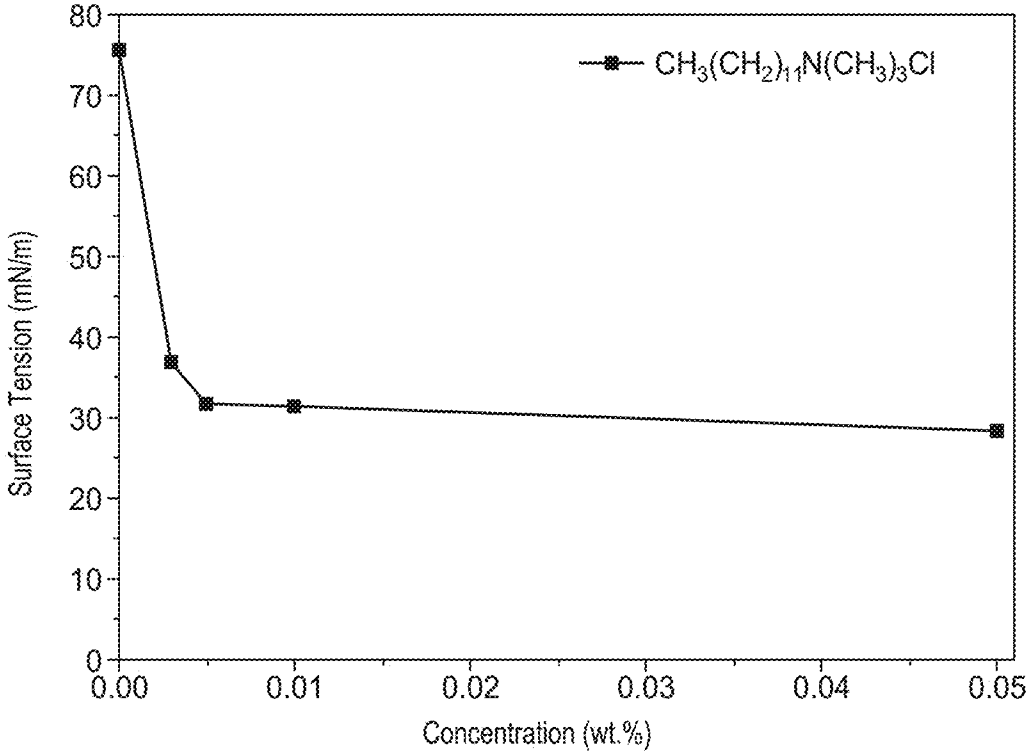
FIG. 18A is exemplary data for the CMC measurement of dodecyltrimethylammonium chloride (DTAC) according to at least one embodiment of the present disclosure.
Figure 18B:
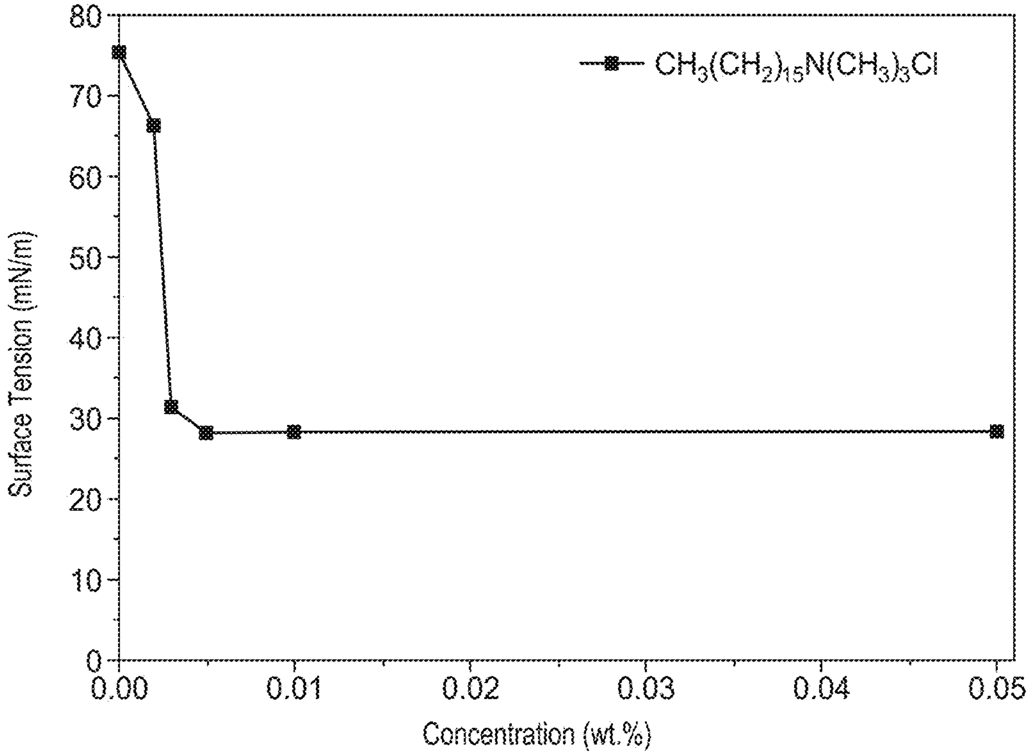
FIG. 18B is exemplary data for the CMC measurement of cetyltrimethylammonium chloride (CTAC) according to at least one embodiment of the present disclosure.
Figure 18C:
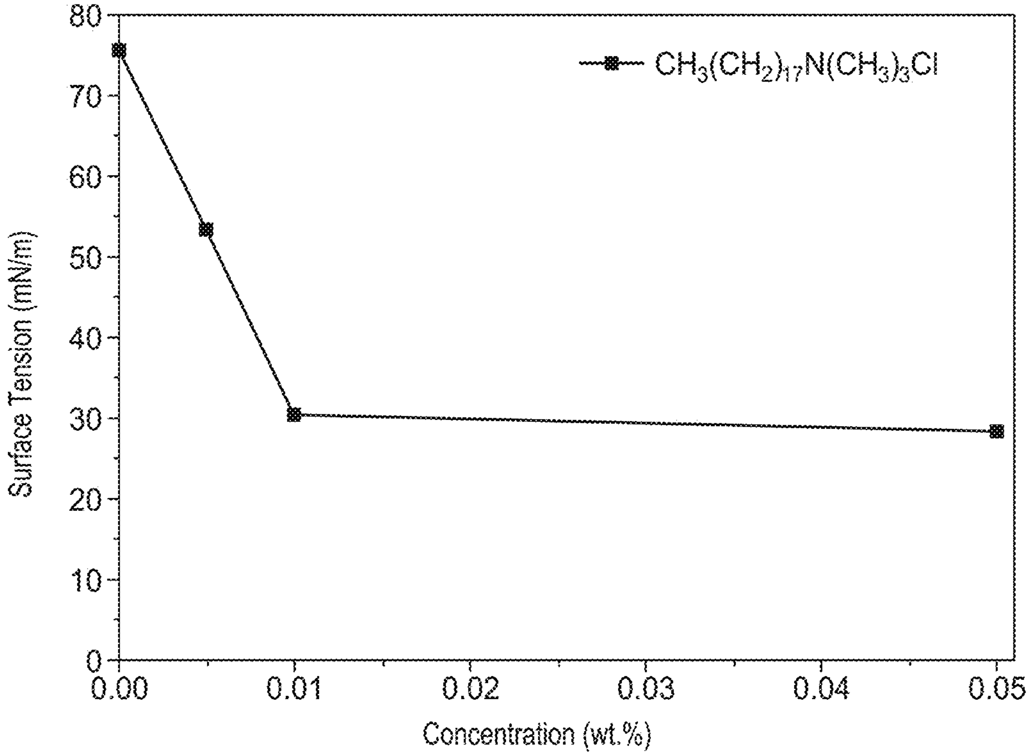
FIG. 18C is exemplary data for the CMC measurement of trimethyloctadecylammonium chloride (TSAC) according to at least one embodiment of the present disclosure.

FIGS. 18A-18C show exemplary data for CMC measurements of surfactants with chloride heads and various alkyl chain lengths and depicting the variations of surface tension with concentration. Specifically, FIGS. 18A, 18B, and 18C show exemplary surface tension data for DTAC, CTAC, and TSAC. Table 8 lists the measured CMC values of the DTAC, CTAC, and TSAC cationic surfactants. The measured CMC values suggested that increasing the hydrophobic chain tail length from 12 carbon atoms ($CH_3(CH_2)_{11}$) to 18 carbon atoms ($CH_3(CH_2)_{17}$) can lower the critical micelle concentration. The measured CMC values also indicated that increasing the hydrophobicity of this group of surfactants can lead to an earlier self-aggregation of surfactant monomers and formation of micelles.

TABLE 8

| Structure | Code Name | CMC (wt %) |
|---|---|---|
| $CH_3(CH_2)_{11}N(CH_3)_3Cl$ | DTAC | about 0.005 |
| $CH_3(CH_2)_{15}N(CH_3)_3Cl$ | CTAC | about 0.003 |
| $CH_3(CH_2)_{17}N(CH_3)_3Cl$ | TSAC | about 0.001 |

IFT measurements of reservoir brine/crude oil at different conditions were then performed. As a baseline for the IFT measurements, the IFT between reservoir crude oil and blank brine was measured using the pendant drop technique at different conditions and the results are shown in Table 9.

TABLE 9

| | Ambient Conditions | Reservoir Conditions 1 (1000 psi, 100° C.) | Reservoir Conditions 1 (6000 psi, 120° C.) |
|---|---|---|---|
| IFT (mN/m) | 17.2 ± 0.8 | 21.8 ± 0.7 | 28.7 ± 1.08 |

Increasing the temperature to about 100° C. and the pressure to about 1,000 psi resulted in an IFT of about 21.8 mN/m. A further increase in temperature and pressure to the actual reservoir conditions increased the IFT by about 7 mN/m. This difference can be mainly attributed to increasing the pressure from about 1,000 to about 6,000 psi since the temperature different was only about 20° C. Henceforth, the reservoir conditions adopted for the measurements of the IFT between surfactant solutions/reservoir oil under reservoir conditions were about 1,000 psi and about 100° C.

Measurement of the IFT between surfactant solutions/reservoir oil at ambient conditions were first performed to, e.g., examine the impact of the hydrophobic chain length on the interfacial properties of cationic surfactants. For these measurements, a KRÜSS Spinning Drop Tensiometer was used. Table 10 shows results for the IFT between various surfactant solutions (~0.1 wt % in blank brine) and reservoir crude oil at ambient conditions. Δρ refers to the change in density, and γ refers to the interfacial tension between surfactant solutions/reservoir oil.

TABLE 10

| Surfactant Code Name | Surfactant Structure | Δρ (g/cm$^3$) | γ (mN/m) |
|---|---|---|---|
| TOAC | $CH_3(CH_2)_7N(CH_3)_3Cl$ | 0.3822 | 5.05 |
| DTAC | $CH_3(CH_2)_{11}N(CH_3)_3Cl$ | 0.3826 | 1.6 |
| CTAC | $CH_3(CH_2)_{15}N(CH_3)_3Cl$ | 0.3834 | 0.11 |
| TSAC | $CH_3(CH_2)_{17}N(CH_3)_3Cl$ | 0.3829 | 0.05 |
| TOAB | $CH_3(CH_2)_7N(CH_3)_3Br$ | 0.3823 | 8.4 |
| DTAB | $CH_3(CH_2)_{11}N(CH_3)_3Br$ | 0.3835 | 1.1 |
| CTAB | $CH_3(CH_2)_{15}N(CH_3)_3Br$ | 0.382 | 0.15 |
| TODAB | $CH_3(CH_2)_{17}N(CH_3)_3Br$ | 0.3831 | 0.07 |
| POE 18 | $CH_3(CH_2)_{12}(CH_2CH_2O)_{18}OH$ | 0.3822 | 0.715 |

As Table 10 shows, there was a systematic decrease in IFT as the number of carbon atoms in the surfactant increases. In other words, use of TOAC and TOAB, with the shortest alkyl chains in this example, resulted in the highest IFT values whereas the use of TSAC and TODAB, with the longest alkyl chains in this example, resulted in the lowest IFT value. Indeed, as the surfactant's hydrophobic tail gets longer, the HLB of the surfactant generally decreases while it becomes more hydrophobic. Therefore, its tendency to move from the aqueous phase to the oil-water interface is expanded. In some circumstance, it was found that the chloride in the hydrophilic head is more effective than bromide in lowering IFT, while in other circumstances the bromide is more effective in reversing wettability.

After performing spontaneous imbibition tests at about 100° C. using the fully-oil-saturated MNC cores, the IFTs between surfactant solutions/reservoir oil at reservoir conditions were then performed using the pendant drop method to, e.g., gain insight into the mechanism of recovery by spontaneous imbibition. For these experiments, the nonionic surfactant POE 18 was blended with cationic surfactants (TOAC, TOAB, DTAC, or DTAB) and tested with the fully-oil-saturated MNC cores. Screening these cationic surfactants at ambient conditions shows that these blends can have higher IFT values compared to CTAC, CTAB, TSAC, and TODAB.

Table 11 shows selected IFT data measured at about 100° C. and about 1,000 psi. For the IFT measurements of these surfactants and the blend, a solution of each was prepared using 0.1 wt % in the blank brine.

TABLE 11

| Surfactant or blend | IFT (mN/m) |
|---|---|
| Blank brine | 21.8 ± 0.7 |
| TOAB (0.1 wt %) | 14.4 ± 0.3 |

TABLE 11-continued

| Surfactant or blend | IFT (mN/m) |
|---|---|
| POE 18 (0.1 wt %) | 9.9 ± 0.4 |
| 75% POE 18 to 25% TOAB (0.1 wt %) | 10.9 ± 0.24 |

The cationic surfactant TOAB reduced the IFT, relative to the blank brine, by about 7 mN/m to about 14.4 mN/m, while the nonionic POE 18 lowered the IFT by about 12 mN/m to about 9.9 mN/m. The blend of POE 18:TOAB reduced the IFT, relative to the blank brine, by about 11 mN/m to about 10.9 mN/m. The effect of POE 18 in decreasing IFT is more pronounced, possibly due to its high emulsification ability and its presence in the blend solution at about 75%. The blend of POE 18:TOAB (about 75:25 v/v) was used for further experiments since, under these non-limiting conditions, it showed the best performance for IFT.

Contact angle measurements were performed to investigate, e.g., the effect of wettability alteration on spontaneous imbibition. The contact angles were measured in the IFT cell on MNC aged rock substrates (WWW systems) using the captive bubble method at about 100° C. and about 1,000 psi. These contact angle measurements are shown in Table 12. For the contact angle measurements of these surfactants and the blend, a solution of each was prepared using 0.1 wt % in the blank brine.

TABLE 12

| Surfactant or blend | Contact angle (°) |
|---|---|
| Blank brine | 110.6 |
| TOAB (0.1 wt %) | 34.9 |
| POE 18 (0.1 wt %) | 127.8 |
| 75% POE 18 to 25% TOAB (0.1 wt %) | 108.4 |

At reservoir conditions, the cationic surfactant TOAB lowered the contact angle to about 34.9° and thus changed the wettability to more water-wet conditions. Conversely, the nonionic surfactant POE 18 significantly reduced IFT by about 12 mN/m which resulted in a higher recovery than TOAB. Combining these two surfactants (about 75% POE 18 to about 25% TOAB) resulted in an intermediate wettability by decreasing contact angle to about 108.4° and a decrease of about 11 mN/m in IFT. The data indicated that excellent results in terms of both fast and effective recoveries can be achieved, in certain circumstances, when the effects of both wettability reversal and IFT reduction are in place.

Overall, the examples illustrated various features. First, surfactant stability in brine can be higher in surfactants with shorter hydrophobic tails and, in some circumstances, may not improve further at high temperature in the case of cationic/nonionic blends. In general, both the IFT and CMC of cationic surfactants can decrease when increasing their hydrophobic (alkyl) chain lengths. Increasing their hydrophobic tail size can allow the surfactants to migrate to the oil/water interface.

Second, among cationic surfactant families, the surfactant structures with that shortest hydrophobic tails can show the highest and fastest oil recoveries by spontaneous imbibition. Even with high IFTs, TOAB and TOAC can perform better in certain circumstances, possibly due to their stability at high temperature. For the OW core samples, increasing the hydrophobic chain length can decrease the recovery for cationic surfactants with bromide heads, and vice-versa for cationic surfactants with chloride heads. CTAB and TSAC can perform better in terms of highest recoveries, possibly due to their high emulsifying properties. In addition, oil recovery can be improved when chloride constituted the hydrophilic group instead of bromide for both OW and WWW MNC core samples. However, bromide can be desirable in certain circumstances.

Third, among nonionic surfactant families, a range of EO groups can enhance oil recovery. The nonionic surfactants with shorter hydrophilic chains can exhibit higher ultimate recoveries than the ones with very high EO groups. Conversely, increasing the hydrophobic chain length in some circumstances did not appear to enhance the recovery further. Makon TD-18, with a single carbon chain length ($C_{13}$) and 18 EO groups, enhanced the recovery by about 16% compared to blank brine. Without wishing to be bound by theory, it is believed that the hydrophilicity of this surfactant (having a high HLB) made its recovery based in large part on wettability alteration rather than IFT reduction. Low salinity brine can also be effective in enhancing oil recovery; however, it was outperformed by several surfactants from each family and combinations thereof despite the high salinity of the surfactant solutions and the high temperature conditions.

Fourth, the examples illustrate various compositions useful for WWW cores or OW cores. For WWW cores, TOAB: POE 18 in a ratio of about 25:75 v/v generally showed the highest and fastest oil recovery among the cationic/nonionic surfactant blends under certain circumstances. While not wishing to be bound by theory, the IFT reducing properties of POE 18 combined with the wettability altering properties of TOAB likely contributed to better synergistic interfacial properties. For oil-wet aged cores, the highest ultimate recovery of about 30% was generally realized by the blend of Tergitol 15-S-15:CTAB (about 50:50 v/v) in certain cases. In some cases, the best performing stable mixtures (no emulsification) were POE 18:TSAC (about 50:50 v/v) and BIO-SOFT N91-8:TSAC (about 50:50 v/v), but their total recoveries may not be as high as mixtures having both wettability alteration and IFT reduction mechanisms. These two mixtures were found, in some circumstances, to be the best as they generated free oil and not solubilized oil.

Embodiments described herein generally relate to methods and compositions for enhanced oil recovery, and more specifically to methods and compositions for, e.g., treating oil-containing porous media for oil recovery or wettability reversal.

As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a formulation, a composition, an element or a group of elements is preceded with the transitional phrase "comprising," it is understood that we also contemplate the same formulation, composition or group of elements with transitional phrases "consisting essentially of," "consisting of," "selected from the group of consisting of," or "Is" preceding the recitation of the formulation, composition, element, or elements and vice versa, e.g., the terms "comprising," "consisting essentially of," "consisting of" also include the product of the combinations of elements listed after the term.

References cited herein are incorporated by reference herein in their entirety to indicate the state of the art as of their publication or filing date and it is intended that this information can be employed herein, if needed, to exclude specific embodiments that are in the prior art.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, embodiments comprising "a surfactant" include embodiments comprising one, two, or more surfactants, unless specified to the contrary or the context clearly indicates only one surfactant is included.

While the foregoing is directed to embodiments of the present disclosure, other and further aspects of the disclosure may be devised without departing from the basic scope thereof, and the scope thereof is determined by the claims that follow.

What is claimed is:

1. A method for treating oil-containing porous media for oil recovery, the method comprising:

introducing a surfactant formulation with a reservoir comprising oil-containing porous media, the oil-containing porous media being oil-wet prior to introducing with the surfactant formulation, the surfactant formulation comprising a surfactant A and a surfactant B:

(A)

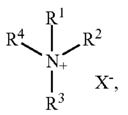

(B)

$R^5(OCH_2CH_2)_nOH$, wherein:

at least one surfactant A is present, and for each surfactant A present, each of $R^1$, $R^2$, and $R^3$ is methyl, $R^4$ is an alkyl group having 18 carbon atoms, and X is, independently, bromide or chloride; and R5 of surfactant B is an alkyl group having 13 carbon atoms, and n of surfactant B is 18;

reversing a wettability of the oil-containing porous media from oil-wet towards water-wet by contacting the oil-containing porous media with the surfactant formulation; and recovering oil from the oil-containing porous media.

2. The method of claim 1, wherein:

at least one surfactant A is present, and each surfactant A present is trimethyloctadecylammonium bromide or trimethyloctadecylammonium chloride.

3. The method of claim 1, wherein the method is performed in a tight oil reservoir, in a hydraulically fractured tight oil reservoir, or on a tight porous media.

4. The method of claim 3, wherein the method is performed in the hydraulically fractured tight oil reservoir, and the method further comprises, prior to the introducing operation:

creating fractures in rock formations in a tight oil reservoir; and propping the fractures open by administering a proppant to form the hydraulically fractured tight oil reservoir.

5. The method of claim 1, wherein the oil-containing porous media is tight porous media.

6. The method of claim 1, wherein a volume ratio of surfactant B to surfactant A in the surfactant formulation is from about 50:50 to about 99:1.

7. The method of claim 1, wherein:

the surfactant formulation further comprises brine; and the method further comprises lowering an interfacial tension between organic phase in the reservoir and aqueous phase present in the surfactant formulation by contacting the oil-containing porous media with the surfactant formulation.

8. The method of claim 1, wherein a volume ratio of surfactant B to surfactant A in the surfactant formulation is from about 70:30 to about 99:1.

9. The method of claim 1, wherein a total amount of surfactant A and surfactant B is from about 0.01 wt % to about 5 wt % based on a total weight of the surfactant formulation.

10. The method of claim 1, wherein:

the surfactant formulation further comprises brine; and a total amount of surfactant A and surfactant B is from about 0.01 wt % to about 1 wt % based on a total weight of the surfactant formulation.

11. The method of claim 10, wherein the brine has a total dissolved solids content from about 100 ppm to about 5,000 ppm.

12. The method of claim 10, wherein the brine has a total dissolved solids content from about 10,000 ppm to about 100,000 ppm.

13. The method of claim 10, wherein the brine has a total dissolved solids content from about 50,000 ppm to about 1,000,000 ppm.

* * * * *